United States Patent
Liu

(10) Patent No.: US 12,072,109 B2
(45) Date of Patent: Aug. 27, 2024

(54) ELECTRIC CONTROL BOX AND WINDOW AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventor: Fashen Liu, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 260 days.

(21) Appl. No.: 17/781,690

(22) PCT Filed: Mar. 3, 2020

(86) PCT No.: PCT/CN2020/077636
§ 371 (c)(1),
(2) Date: Jun. 1, 2022

(87) PCT Pub. No.: WO2021/134903
PCT Pub. Date: Jul. 8, 2021

(65) Prior Publication Data
US 2023/0003397 A1 Jan. 5, 2023

(30) Foreign Application Priority Data

Dec. 31, 2019 (CN) .......................... 201911426040.1
Dec. 31, 2019 (CN) .......................... 201922493803.6
(Continued)

(51) Int. Cl.
*F24F 1/20* (2011.01)
*F24F 11/89* (2018.01)
*F24F 13/20* (2006.01)

(52) U.S. Cl.
CPC ................ *F24F 1/20* (2013.01); *F24F 11/89* (2018.01); *F24F 13/20* (2013.01); *F24F 2221/52* (2013.01)

(58) Field of Classification Search
CPC .......... F24F 1/20; F24F 11/89; F24F 2221/52; F24F 1/22; H02G 3/08
See application file for complete search history.

(56) References Cited

U.S. PATENT DOCUMENTS

| 2006/0153362 | A1* | 7/2006 | Bloodworth | H02G 3/08 379/413.02 |
|---|---|---|---|---|
| 2012/0195000 | A1* | 8/2012 | Hika | F24F 1/46 361/692 |
| 2017/0176028 | A1* | 6/2017 | Jeon | F24F 13/20 |

FOREIGN PATENT DOCUMENTS

| CN | 208804785 U | 4/2019 |
|---|---|---|
| CN | 109724169 A | 5/2019 |

(Continued)

OTHER PUBLICATIONS

World Intellectual Property Organization (WIPO) International Search Report and Written Opinion for PCT/CN2020/077636 Oct. 9, 2020 19 Pages (with translation).

*Primary Examiner* — Lionel Nouketcha
(74) *Attorney, Agent, or Firm* — Anova Law Group, PLLC

(57) ABSTRACT

An electric control box includes a box body including a bottom plate and a box cover covering the bottom plate. The box cover include an outer box cover and an inner box cover. The inner box cover includes a water blocking member at an edge of the inner box cover. The water blocking member protrudes outward from the edge of the inner box cover toward an edge of the outer box cover. The water blocking member is configured to block water on the outer box cover from flowing into the inner box cover.

20 Claims, 30 Drawing Sheets

(30) Foreign Application Priority Data

Dec. 31, 2019 (CN) .......................... 201922493999.9
Dec. 31, 2019 (CN) .......................... 201922496343.2
Dec. 31, 2019 (CN) .......................... 201922499091.9

(56) References Cited

FOREIGN PATENT DOCUMENTS

| | | |
|---|---|---|
| CN | 208846544 U | 5/2019 |
| CN | 209857330 U | 12/2019 |
| CN | 110906459 A | 3/2020 |
| JP | 2001099448 A | 4/2001 |

\* cited by examiner

ELECTRIC CONTROL BOX AND WINDOW AIR CONDITIONER

CROSS-REFERENCE TO RELATED APPLICATIONS

This application is a National Stage Entry under 35 U.S.C. § 371 of International Application No. PCT/CN2020/077636, filed on Mar. 3, 2020, which claims priority to Chinese Patent Application No. 201911426040.1, entitled "ELECTRIC CONTROL BOX AND WINDOW AIR CONDITIONER," Chinese Patent Application No. 201922493999.9, entitled "ELECTRIC CONTROL BOX AND WINDOW AIR CONDITIONER," Chinese Patent Application No. 201922496343.2, entitled "ELECTRIC CONTROL BOX AND WINDOW AIR CONDITIONER," Chinese Patent Application No. 201922493803.6, entitled "ELECTRIC CONTROL BOX AND WINDOW AIR CONDITIONER," and Chinese Patent Application No. 201922499091.9, entitled "ELECTRIC CONTROL BOX AND WINDOW AIR CONDITIONER," all filed on Dec. 31, 2019, the entire contents of which are incorporated herein by reference.

TECHNICAL FIELD

The present disclosure relates to the technical field of air conditioners, and in particular, to an electric control box and a window air conditioner.

BACKGROUND

In the related art, the box body inside the electric control box usually includes a bottom plate and a box cover that covers the bottom plate. However, an assembly gap is formed at the position where the bottom plate and the box cover are engaged with each other. When the water from the external environment falls on the box cover, it will flow into the assembly gap along the side wall of the box cover, and then penetrate into the interior of the electric control box, causing the electric control assemblies inside the electric control box to be damaged by moisture.

SUMMARY

The main purpose of the present disclosure is to provide an electric control box and a window air conditioner, which aim to improve the waterproof performance of the electric control box, so as to avoid moisture damage to the electric control assemblies inside the electric control box.

In order to achieve the above objective, the present disclosure provides an electric control box and a window air conditioner including the electric control box. The electric control box includes a box body including a bottom plate and a box cover that covers the bottom plate; the box cover includes an outer box cover and an inner box cover, and an edge of the inner box cover is configured with a water blocking member; and the water blocking member protrudes outward from the edge of the inner box cover toward an edge of the outer box cover, and the water blocking member is configured for blocking water on the outer box cover from flowing into the inner box cover.

In an embodiment, the inner box cover has an upper cover plate corresponding to a top wall of the outer box cover, a flange extends from an outer side of the upper cover plate toward an outer side of the outer box cover, and the flange forms the water blocking member.

In an embodiment, the top wall of the outer box cover is provided with an installation member, the installation member is provided with an installation hole, and the installation hole is configured for a connection member to pass through to connect and fix the box body to an external structure; a top of the inner box cover is configured with a drainage groove corresponding to the installation hole.

In an embodiment, the top of the inner box cover is provided with a plurality of support ribs protruding therefrom, a plurality of the support ribs are suitable for supporting the top wall of the outer box cover, and the drainage groove is formed between two adjacent ribs.

In an embodiment, a back of the inner box cover is configured with a guiding groove extending in an up-down direction, an upper end of the guiding groove is connected with the drainage groove, and a lower end of the guiding groove extends to a bottom of the inner box cover.

In an embodiment, the upper end of the drainage groove is arranged in a constricted shape from top to bottom.

In an embodiment, the upper cover plate of the inner box cover is inclined toward the drainage groove from the outer side of the inner box cover to the inner side thereof.

In an embodiment, the inner box cover has a first side plate and a second side plate opposite to the first side plate, a slot is configured on the inner box cover, the slot extends from the first side plate, through the upper cover plate and to the second side plate, and both ends of the slot open downward; the bottom plate includes an outer bottom plate and an inner bottom plate, and a peripheral edge of the inner bottom plate is configured with an insertion member corresponding to the slot.

In an embodiment, the insertion member has an upper surface corresponding to the upper cover plate of the inner box cover, and the upper surface of the insertion member is inclined downward from the inner side of the inner box cover to the outer side thereof.

In an embodiment, the insertion member of the inner bottom plate is further configured with a sealing groove, an extension direction of the sealing groove is consistent with that of the insertion member, and a sealing strip is provided in the sealing groove.

In an embodiment, a positioning protrusion protrudes from an inner surface of the slot toward the sealing groove, and the positioning protrusion protrudes into the sealing groove and abuts against the sealing strip.

In an embodiment, the electric control box further includes an electric control board and an inductor mounted at the bottom plate; a main cavity and an auxiliary cavity are provided inside the inner box cover; and the main cavity is configured for accommodating components on the electric control board, and the auxiliary cavity is configured for accommodating the inductor.

In an embodiment, the bottom plate includes an outer bottom plate and an inner bottom plate; and the inner plastic bottom plate is hollowed out at a position corresponding to the electric control board, to form a heat dissipation area between the electric control board and the outer metal bottom plate.

In an embodiment, a distance between the electric control board and the outer bottom plate is not less than 8 mm and not more than 18 mm.

In an embodiment, a heat dissipation gap is formed between a side wall of the main cavity and the outer box cover, and the side wall of the main cavity is further provided with a heat dissipation hole corresponding to the heat dissipation gap.

In an embodiment, a periphery of the heat dissipation hole is provided with a water baffle protruding therefrom, and a surface of the water baffle is inclined downward from an inner side of the heat dissipation hole to an outer side thereof.

In an embodiment, the electric control box further includes a heat sink mounted at the electric control board, and the sealing sleeve is sleeved on a circumference of the heat sink; the box cover is provided with an extension opening for the heat sink to protrude outward, an inner surface of the box cover is formed with a sink groove on a circumference of the extension opening, and the sink groove is fitted and engaged with the sealing sleeve.

In an embodiment, a surface of the sink groove is provided with a plurality of annular ribs protruding therefrom, the plurality of annular ribs surround the circumference of the extension opening successively, and the annular ribs abut against a surface of the sealing sleeve.

In an embodiment, the cross-section of the annular rib may be configured in a semicircular shape; alternatively, the cross-section of the annular rib may be configured in a square shape; or the cross-section of the annular rib may be configured in a trapezoid shape.

In an embodiment, the outer box cover is made of metal; the inner box cover is made of plastic; the bottom plate includes an outer bottom plate and an inner bottom plate, and the outer bottom plate is made of metal; the inner bottom plate is made of plastic.

In an embodiment, the window air conditioner includes a chassis, a housing, an outdoor fan, and an electric control box. The housing is mounted at the chassis, the housing includes an outdoor housing and an indoor housing, a top plate of the outdoor housing is provided with an outdoor air inlet; the outdoor fan is mounted inside the outdoor housing; the electric control box is installed at the outdoor housing, the electric control box is vertical and corresponding to an air inlet side of the outdoor fan.

In an embodiment, the outdoor air inlet has an inlet edge away from the outdoor fan, a box cover of the electric control box corresponds to the inlet edge, and a water blocking member of the box cover is located at a side of the inlet edge that faces away from the outdoor air inlet.

In an embodiment, a distance between the water blocking member and the inlet edge is not less than 6 mm.

In an embodiment, a distance between the water blocking member and the inlet edge is not more than 50 mm.

In an embodiment, the top plate of the outdoor housing is provided with a fixation member, and the fixation member is suitable for being connected and fixed with the installation member on the top of the electric control box using a connection member.

In an embodiment, the housing is provided with a partition groove, the housing is divided into the indoor housing and the outdoor housing by the partition groove, and the partition groove is configured for a shielding member at a window to extend into.

In an embodiment, the window air conditioner further includes a sealing member movably mounted in the partition groove, the sealing member is movable to switch between a storage state and a working state; the sealing member is stored in the partition groove in the storage state; and the sealing member protrudes laterally from the partition groove, and is configured for the shielding member and/or an inner wall of the window to abut against in the working state.

In technical solutions of the present disclosure, a water blocking member is provided at the edge of the inner box cover of the electric control box, and the water blocking member protrudes outward from the edge of the inner box cover toward the edge of the outer box cover. The water blocking member is configured for blocking the flow of water on the outer box cover to the inside of the inner box cover, thereby improving the waterproof performance of the electric control box and reducing the occurrence of water from the external environment falling into the electric control box, and preventing the electric control assemblies inside the electric control box from being damaged by moisture.

BRIEF DESCRIPTION OF THE DRAWINGS

In order to more clearly illustrate the embodiments of the present disclosure or the technical solutions in the existing technologies, the following briefly introduces the accompanying drawings that need to be used in the description of the embodiments or the existing technologies. Obviously, the drawings in the following description are only some embodiments of the present disclosure. For those of ordinary skill in the art, other drawings can also be obtained based on the structures shown in these drawings without any creative effort.

FIG. 8 is a front view of the inner bottom plate in FIG. 17.

Figure 1:
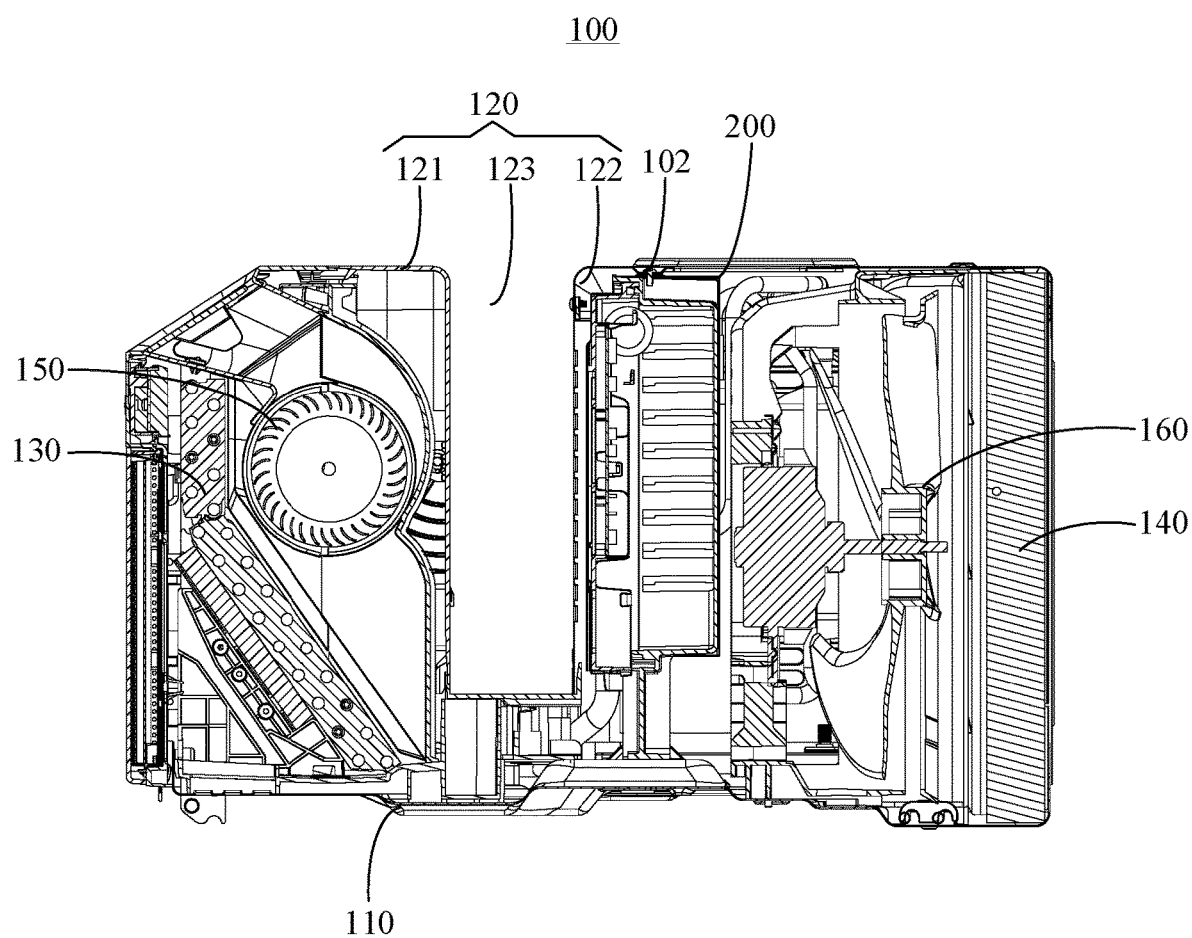
FIG. 1 is a schematic structural view of a window air conditioner according to an embodiment of the present disclosure.

| Description of reference numerals | |
|---|---|
| reference numeral | name |
| 100 | window air conditioner |
| 110 | chassis |
| 120 | housing |
| 121 | indoor housing |
| 122 | outdoor housing |
| 123 | partition groove |
| 130 | indoor heat exchanger |
| 140 | outdoor heat exchanger |
| 150 | indoor fan |
| 160 | outdoor fan |
| 170 | outdoor air inlet |
| 171 | inlet edge |
| 180 | fixation member |
| 200 | electric control box |
| 210 | box body |
| 211 | bottom plate |
| 212 | box cover |
| 220 | electric control board |
| 230 | inductor |
| 240 | heat sink |
| 241 | base plate |
| 242 | heat dissipation fin |
| 250 | sealing sleeve |
| 300 | outer bottom plate/outer metal bottom plate |
| 400 | inner bottom plate/inner plastic bottom plate |
| 410 | hollowed-out position |
| 420 | insertion member |
| 421 | sealing groove |
| 430 | sealing strip |
| 440 | grid bracket |
| 500 | outer box cover/outer metal box cover |
| 580 | installation member |
| 600 | inner box cover/inner plastic box cover |
| 610 | upper cover plate |
| 611 | water blocking member |
| 620 | first side plate |
| 630 | second side plate |
| 640 | drainage groove |
| 641 | support rib |
| 650 | guiding groove |
| 660 | slot |
| 661 | positioning protrusion |
| 680 | heat dissipation hole |
| 681 | water baffle |
| 690 | sink groove |
| 691 | annular rib |
| 601 | main cavity |
| 602 | auxiliary cavity |
| 603 | extension opening |
| 700 | sealing member |

The realization of the objective, functional characteristics, and advantages of the present disclosure are further described with reference to the accompanying drawings.

DETAILED DESCRIPTION OF THE EMBODIMENTS

Figure 2:
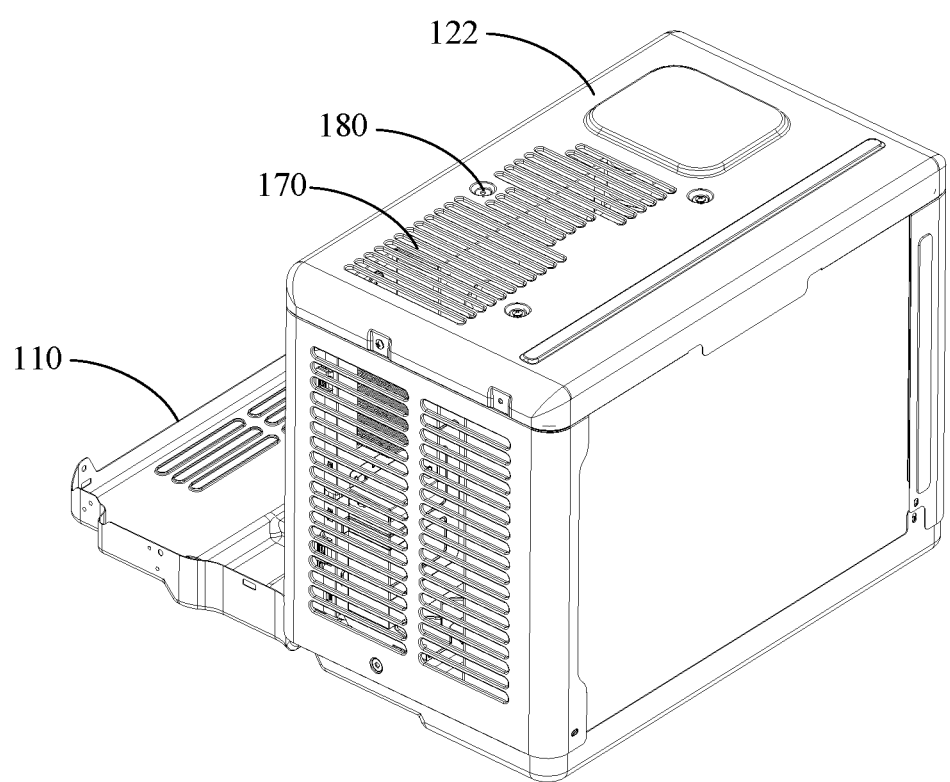
FIG. 2 is a partial schematic structural view of the window air conditioner in FIG. 1.
Figure 3:
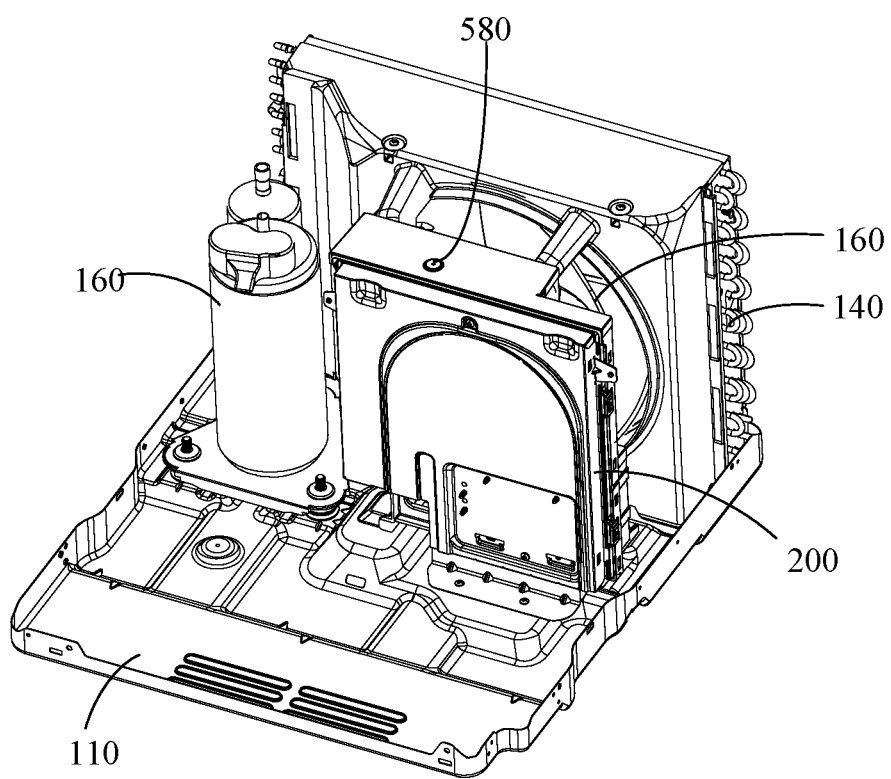
FIG. 3 is another partial schematic structural view of the window air conditioner in FIG. 2.

As shown in FIG. 1 to FIG. 3, the present disclosure provides an embodiment of an electric control box. The electric control box 200 is suitable for being installed in electrical equipment as an electric control device. For example, the electric control box 200 may be applied to an air conditioner or other home appliances. The air conditioner may be a window air conditioner 100 or a split-type air conditioner. For the window air conditioner 100, the electric control box 200 may be installed in the indoor housing of the window air conditioner 100, or may be installed in the outdoor housing of the window air conditioner 100. For the split-type air conditioner, the electric control box 200 may be installed in an indoor unit or an outdoor unit. In the following embodiments, the application of the electric control box 200 to the window air conditioner 100 is mainly used as an example for introduction.

Figure 11:
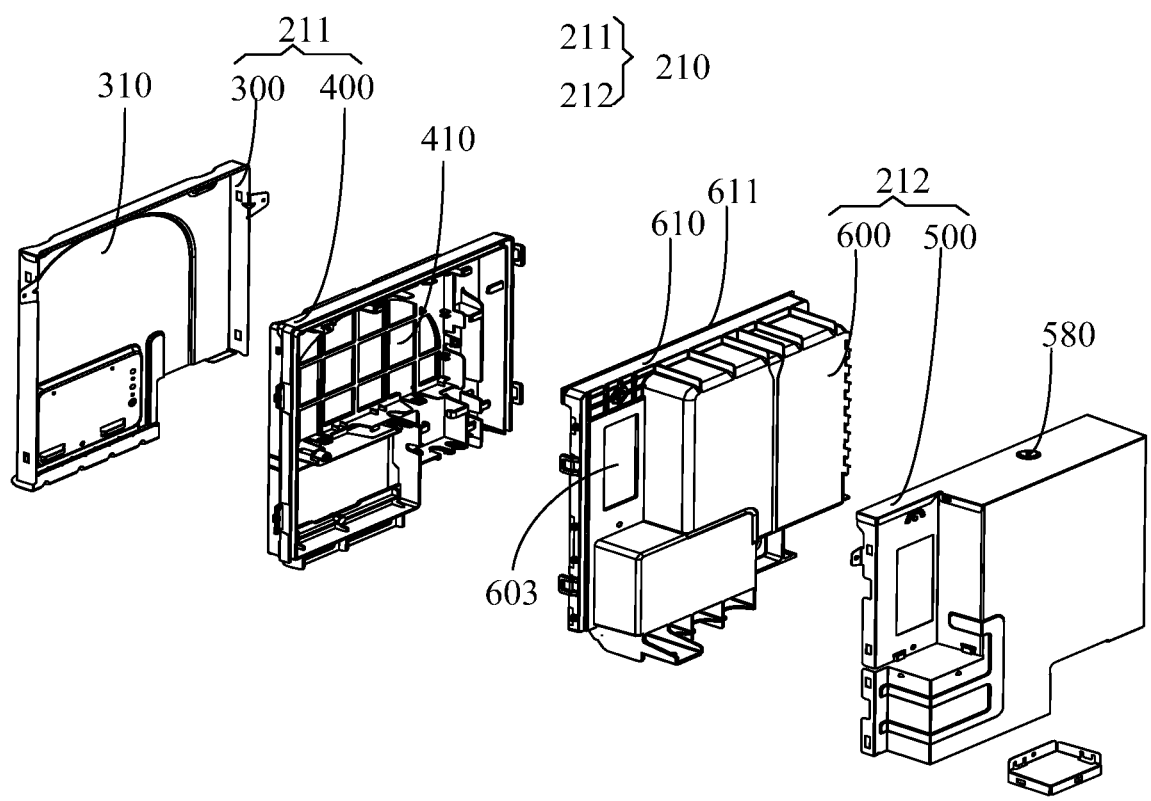
FIG. 11 is a schematic structural view of a box body of the electric control box in FIG. 4.

As shown in FIG. 4 to FIG. 7, in an embodiment of the present disclosure, the electric control box 200 includes a box body 210. The box body 210 includes a bottom plate 211 and a box cover 212 that covers the bottom plate 211. The box cover 212 includes an outer box cover 500 and an inner box cover 600 (as shown in FIG. 11), and an edge of the inner box cover 600 is configured with a water blocking member 611. The water blocking member 611 protrudes outward from the edge of the inner box cover 600 toward an edge of the outer box cover 500, and the water blocking member 611 is configured for blocking water on the outer box cover 500 from flowing into the inner box cover 600.

The electric control box 200 may be placed vertically; or the electric control box 200 may also be placed horizontally. For example, the electric control box 200 is placed vertically. In this case, the box body 210 of the electric control box 200 is vertical, and the box cover 212 of the box body 210 is opposite to its bottom plate 211 in the front-rear direction or the left-right direction. Since the box cover 212 covers the bottom plate 211, the water falling on the top of the outer box cover 500 will be blocked by the water blocking member 611 on the inner box cover 600. Therefore, the water cannot flow to the inner side of the inner box cover 600, so the water can only be drained down along the back or side surface of the outer box cover 500, and it is difficult to enter the interior of the inner box cover 600.

For another example, the electric control box 200 is placed horizontally, in this case, the box body 210 of the electric control box 200 is horizontal, and the box cover 212 of the box body 210 is opposite to its bottom plate 211 in the up-down direction. Since the box cover 212 covers the bottom plate 211, the water falling on the top of the outer box cover 500 will be blocked by the water blocking member 611 on the inner box cover 600 and cannot flow to the inner side of the inner box cover 600, instead, can only be dripped down from the outer edge of the water blocking member 611 and discharged. Since the outer edge of the water blocking member 611 is far away from the inside of the inner box cover 600, the water cannot easily enter the inside of the inner box cover 600.

The above two ways of arranging the electric control box 200 can be reasonably selected according to the position of the electric control box 200 in the application product, which is not limited herein. In order to avoid redundant description, in the following embodiments, the electric control box 200 is mainly provided in the vertical direction for introduction and description.

In technical solutions of the present disclosure, the water blocking member 611 is provided at the edge of the inner box cover 600 of the electric control box 200, and the water blocking member 611 protrudes outward from the edge of the inner box cover 600 toward the edge of the outer box cover 500. The water blocking member 611 is configured for blocking the flow of water on the outer box cover 500 to the inside of the inner box cover 600, thereby improving the waterproof performance of the electric control box 200 and reducing the occurrence of water from the external environment falling into the electric control box 500, and preventing the electric control assemblies inside the electric control box 200 from being damaged by moisture.

Figure 4:
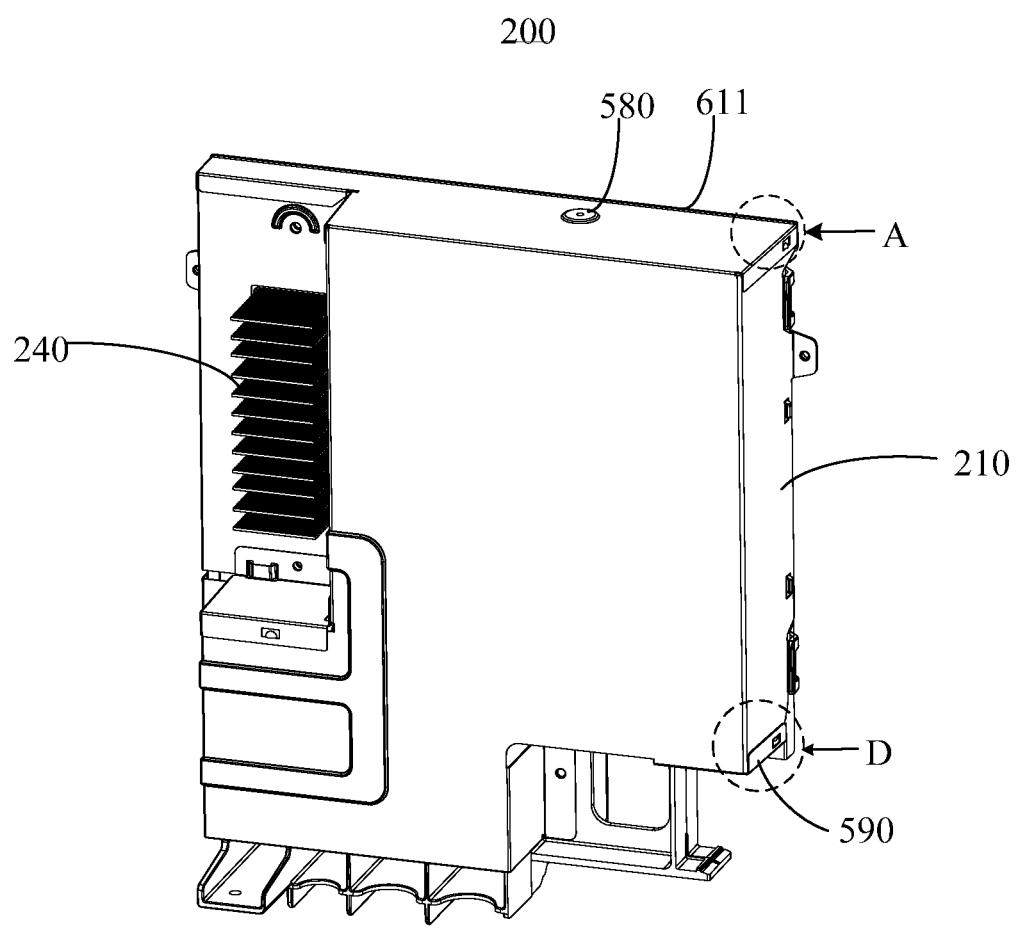
FIG. 4 is a schematic structural view of an electric control box according to an embodiment of the present disclosure.
Figure 12:
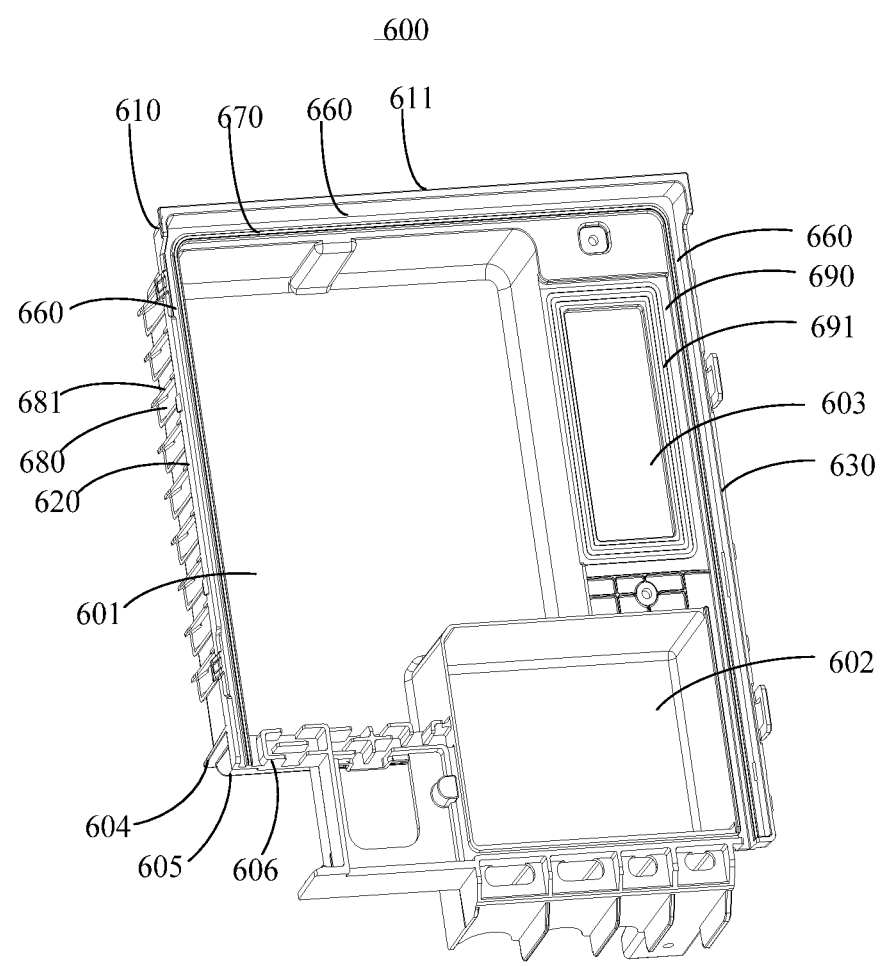
FIG. 12 is a front view of an inner box cover in FIG. 11.

As shown in FIG. 4, FIG. 11 and FIG. 12, in an embodiment, for the box body 210 of the electric control box 200, the bottom plate 211 of the box body 210 includes an outer bottom plate 300 and an inner bottom plate 400, and the box cover 212 includes an outer box cover 500 and an inner box cover 600. The outer box cover 500 is made of metal, and the inner box cover 600 is made of plastic; and/or, the outer bottom plate 300 is made of metal, and the inner bottom plate 400 is made of plastic.

The box body 210 of the electric control box 200 actually has an inner part and an outer part. The inner part is composed of the inner bottom plate 400 and the inner box cover 600. The inner part (i.e., the inner bottom plate 400 and the inner box cover 600) is made of plastic, which is convenient for manufacturing and molding, and has low manufacturing cost. The outer part is composed of the outer bottom plate 300 and the outer metal box cover 212. The outer part is made of metal, which can play the role of fire prevention and rust prevention, so that the electric control box 200 has high safety performance. The water blocking member 611 is integrated with the inner box cover 600, and additional manufacturing processes can be added, which can improve production efficiency.

Figure 7:
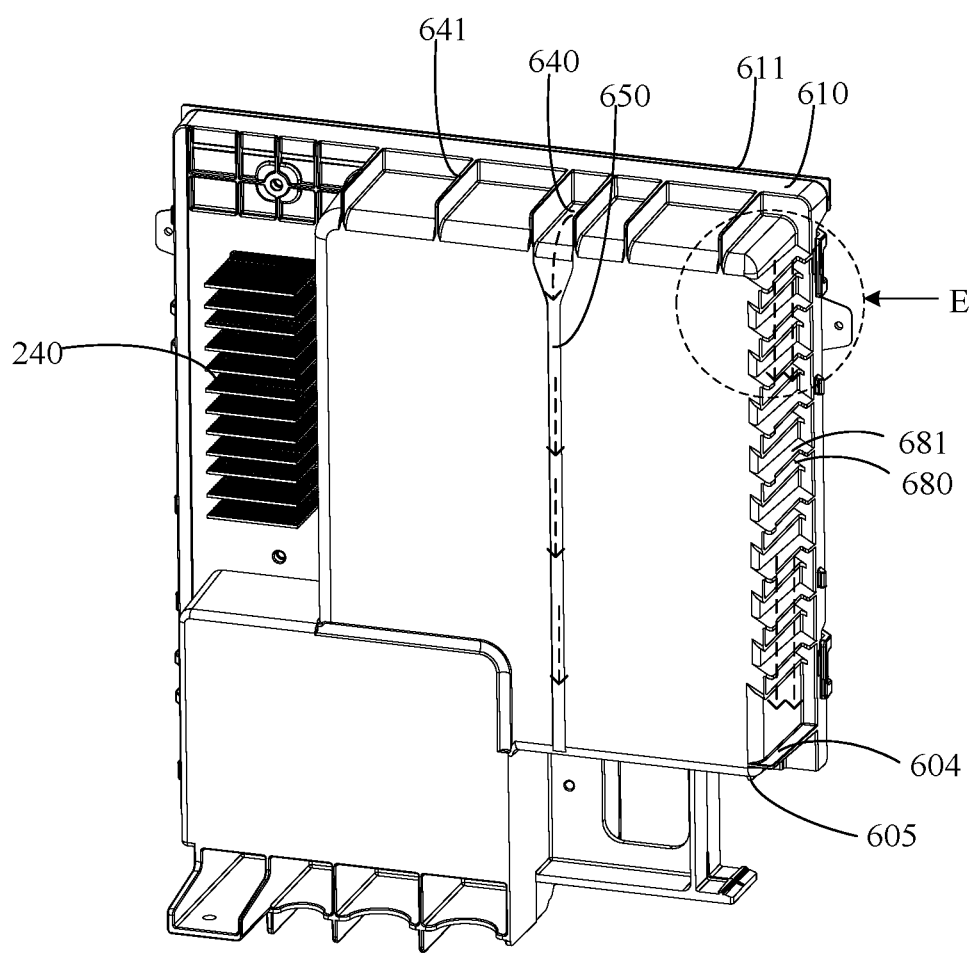
FIG. 7 is a schematic structural view of the electric control box in FIG. 4 with an outer cover removed.

As shown in FIG. 4, FIG. 7 and FIG. 11, in an embodiment, the water blocking member 611 can be a water blocking plate, or a water blocking rib, or a water blocking flange, or other structures that can play a role in blocking water. The inner box cover 600 has an upper cover plate 610, and the upper cover plate 610 corresponds to the top wall of the outer box cover 500. The outer side of the upper cover plate 610 has a flange extending toward the outer side of the outer box cover 500, and the flange forms the water blocking member 611. Specifically, the side surface of the water blocking member 611 abuts against the upper edge of the outer box cover 500, so that the gap between the outer box cover 500 and the water blocking member 611 can be reduced.

When the water of the external environment falls on the top of the outer box cover 500, this part of the water is not easy to penetrate into the gap between the outer box cover 500 and the water blocking member 611, and can only be drained downward from the side or back of the outer box cover 500. Of course, in addition to providing the water blocking member 611 on the upper cover 610, the water blocking member 611 can also be provided at other edges of the inner box cover 600 (e.g., left and right side panels). In view of the characteristics of water flowing from top to bottom, it is not easy for water to penetrate into the interior of the inner box cover 600 from both sides of the outer box cover 500, therefore, it is not necessary to provide the water blocking member 611 on the left and right edges of the inner box cover 600.

As shown in FIG. 4, FIG. 7 and FIG. 11, in an embodiment, the top wall of the outer box cover 500 is provided with an installation member, and the installation member is provided with an installation hole, and the installation hole is configured for a connection member to pass through to connect and fix the box body 210 with the external structure. After the connection member passes through the installation hole, the inner end of the connection member is located between the outer box cover 500 and the inner box cover 60. If the connection member and the installation hole are loose, the water falling on the outer box cover 500 may also fall onto the inner box cover 600 from the installation hole along the connection member. In view of this, a drainage groove 640 corresponding to the installation hole is provided at the top of the inner box cover 600, and the drainage channel 640 can receive water falling onto the inner box cover 600 from the installation hole.

Figure 20:
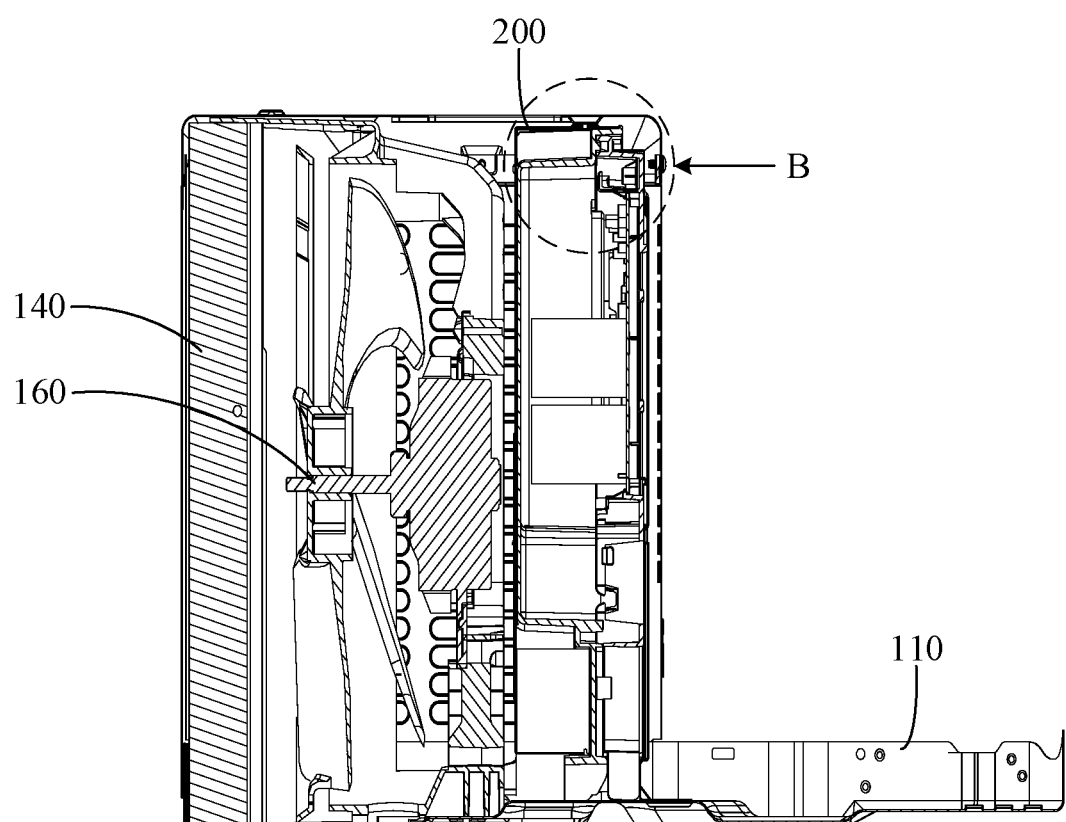
FIG. 20 is a schematic view of the assembly of the electric control box and an outdoor housing of the window air conditioner according to the present disclosure.
Figure 21:
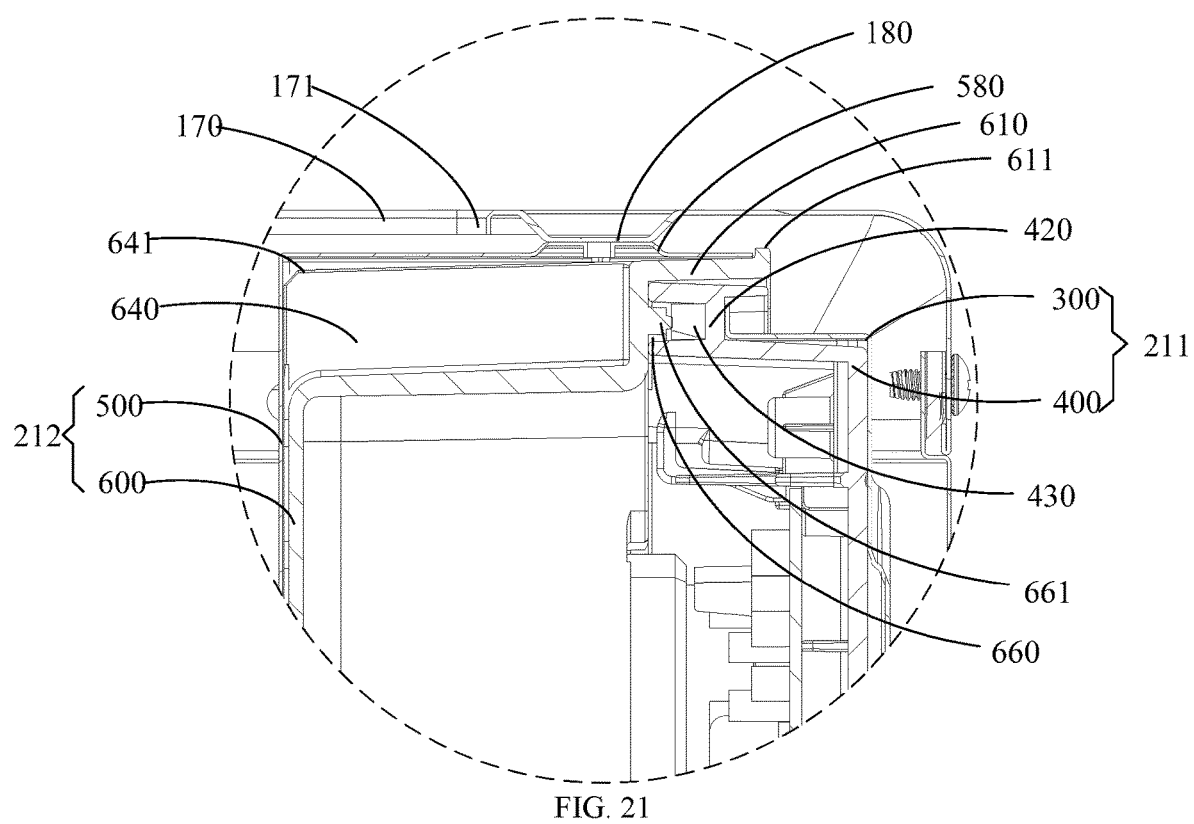
FIG. 21 is an enlarged view of portion B in FIG. 20.

As shown in FIG. 7, FIG. 20 and FIG. 21, considering that the outer box cover 500 and the water blocking member 611 are not completely sealed, when the amount of water falling on the outer box cover 500 is large, water may also accumulate between the outer box cover 500 and the inner box cover 600 from the gap between the outer box cover 500 and the water blocking member 611, and there is a great installation hidden danger. To avoid this, optionally, the upper cover plate 610 of the inner box cover 600 is inclined toward the drainage groove 640 from the outer side of the inner box cover 600 to the inner side thereof. That is to say, an included angle α is formed between the upper cover plate 610 and the horizontal plane (for the included angle α, please refer to FIG. 22), such that the water infiltrating from the gap between the outer box cover 500 and the water blocking member 611 will flow into the drainage groove 640 along the inclined direction of the upper cover plate 610, then is discharged downward from the drainage groove 640 through the back surface of the inner box cover 212.

In an embodiment, a plurality of support ribs 641 protrude from the top of the inner box cover 600. The plurality of the support ribs 641 are suitable for supporting the top wall of the outer box cover 500, and the drainage groove 640 is formed between two adjacent ribs. Specifically, the plurality of the support ribs 641 cooperate to support the top wall of the outer box cover 500 to prevent the top wall of the outer box cover 500 from collapsing downward. A groove is formed between two adjacent support ribs 641, and one end of the groove open toward the back of the inner box cover 212. Therefore, the groove can be used as the drainage groove 640, so that the water supplied in the drainage groove 640 is drained downward toward the back of the inner box cover 212. Of course, in other embodiments, the top of the inner box cover 600 may also be directly recessed.

As shown in FIG. 7, FIG. 20 and FIG. 21, in an embodiment, in order to avoid the accumulation of water in the drainage groove 640, a guiding groove 650 extending in the up-down direction is provided at the back of the inner box cover 600. The upper end of the guiding groove 650 is in abutment with the drainage groove 640, and the lower end of the guiding groove 650 extends to the bottom of the inner box cover 600. In this way, the water in the drainage groove 640 can flow downward along the guiding groove 650, and finally be discharged from the gap at the bottom of the box body 210 to avoid accumulation inside the box body 210.

In order to facilitate the water in the drainage groove 640 to enter the guiding groove 650, the upper end of the guiding groove 650 is arranged in a constricted shape from top to bottom, such that the upper end of the guiding groove 650 has less resistance to water flow, and the water in the drainage groove 640 can smoothly enter the guiding groove 650 under the guidance of the constriction of the upper end of the guiding groove 650 to reduce splashing of water flow.

As shown in FIG. 11, FIG. 12 and FIG. 20, based on any one of the above embodiments, considering the water splashed on the bottom plate 211 by the external environment, it is also possible to enter the interior of the electric control box 200 from the assembly gap between the bottom plate 211 and the box cover 212. In order to reduce the occurrence of this situation, the inner box cover 600 has a first side plate 620 and a second side plate 630 opposite to the first side plate 620, a slot 660 is provided at the inner box cover 600, the slot 660 extends from the first side plate 620 through the upper cover plate 610 to the second side plate 630, and both ends of the slot 660 open downward. The bottom plate 211 includes an outer bottom plate 300 and an inner bottom plate 400, and the periphery of the inner bottom plate 400 is provided with an insertion member 420 corresponding to the slot 660 (as shown in FIG. 20 and FIG. 21).

When assembling the box body 210 of the electric control box 200, the insertion member 420 of the bottom plate 211 is inserted and connected to the slot 660 of the inner box cover 600, so that the inner box cover 600 covers the bottom plate 211. Since the electric control box 200 is arranged vertically, so that the openings at both ends of the slot 660 face downward. If the water splashed from the external environment enters the assembly gap between the bottom plate 211 and the box cover 212, it will first enter the slot 660 of the inner box cover 600, then, is discharged downward along the slot 660 to the openings at both ends thereof, which greatly improves the waterproof performance of the electric control box 200.

Figure 23:
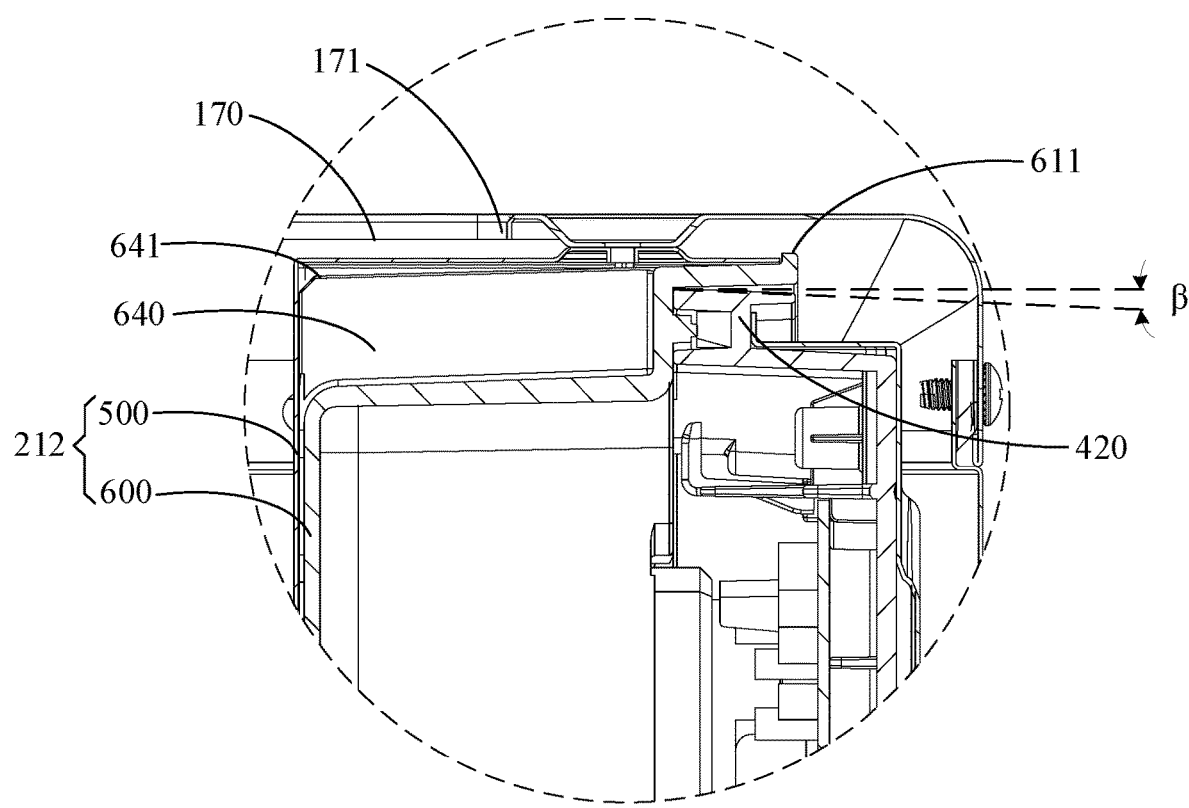
FIG. 23 is a schematic view of the inclination angle of the upper surface of the insertion member of the inner bottom plate in FIG. 21.

As shown in FIG. 20 and FIG. 23, further, the insertion member 420 has an upper surface corresponding to the upper cover plate 610 of the inner box cover 600, and the upper surface of the insertion member 420 is inclined downward from the inner side of the inner box cover 600 to the outer side thereof. That is to say, the upper surface of the insertion member 420 forms an included angle β with the horizontal plane. Therefore, even if water enters from the slit between the upper cover 610 and the insertion member 420, then, when this part of the water contacts the upper surface of the insertion member 420, it will be drained to the outside and downward along the upper surface of the insertion member 420, and it is difficult to enter the slot 660.

Figure 18:
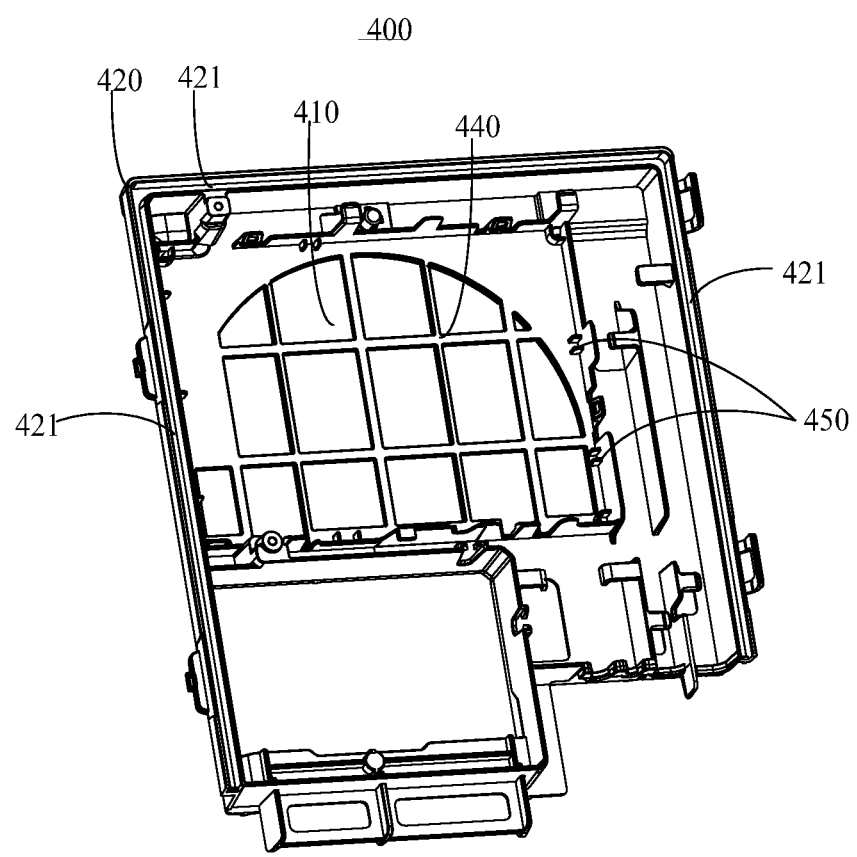
Figure 19:
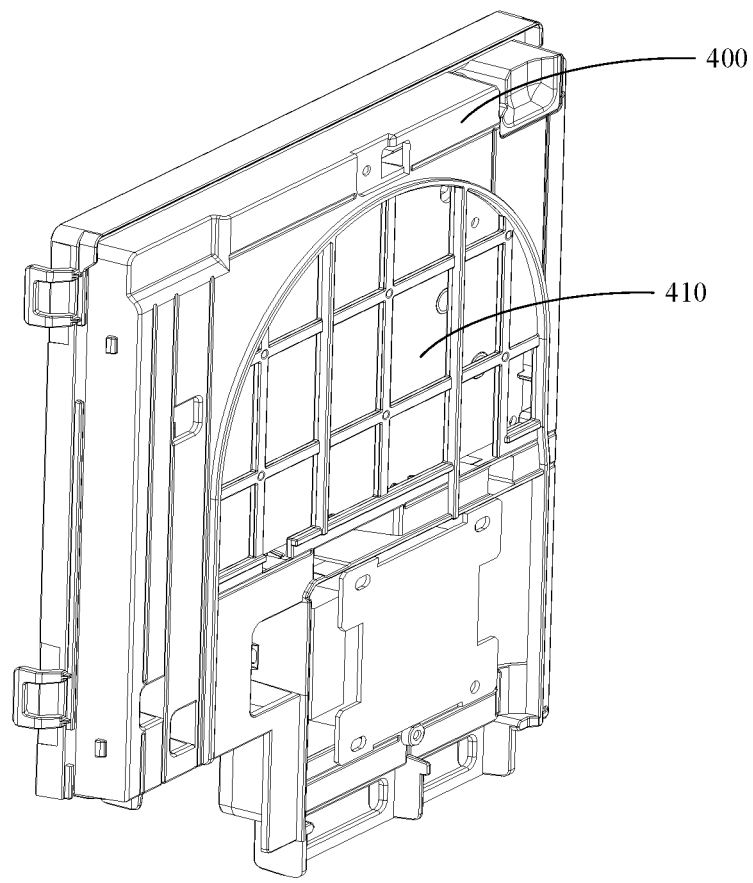
FIG. 19 is a rear view of the inner bottom plate in FIG. 17.

As shown in FIG. 11, FIG. 12 and FIG. 18, in an embodiment, in order to improve the waterproof performance of the box body 210 of the electric control box 200, the assembly position between the bottom plate 211 of the box body 210 and the box cover 212 may also be sealed. Optionally, a sealing groove 421 is further provided at the insertion member 420 of the inner bottom plate 400, the extension direction of the sealing groove 421 is consistent with the extension direction of the inserting portion 420, and a sealing strip 430 is provided in the sealing groove 421 (as shown in FIG. 21).

After the sealing strip 430 is made of elastic waterproof material such as rubber or silicone, when the sealing strip 430 abuts against the inner surface of the slot 660, the sealing strip 430 can be elastically deformed so as to tightly abut against the inner surface of the slot 660, thereby reducing the gap between the slot 660 and the insertion member 420 and reducing the possibility of water infiltrating through the gap.

Further, a positioning protrusion 661 may also protrude on the inner surface of the slot 660 toward the sealing groove 421. The positioning protrusion 661 extends into the sealing groove 421 and abuts against the sealing strip 430. The slot 660 abuts against the sealing strip 430 by the positioning protrusion 661, so that the sealing strip 430 can be pressed in the sealing groove 421, the elastic deformation of the sealing strip 430 is increased, so that the sealing strip 430 and the positioning protrusion 661 abut more tightly, and the sealing effect is better.

Figure 17:
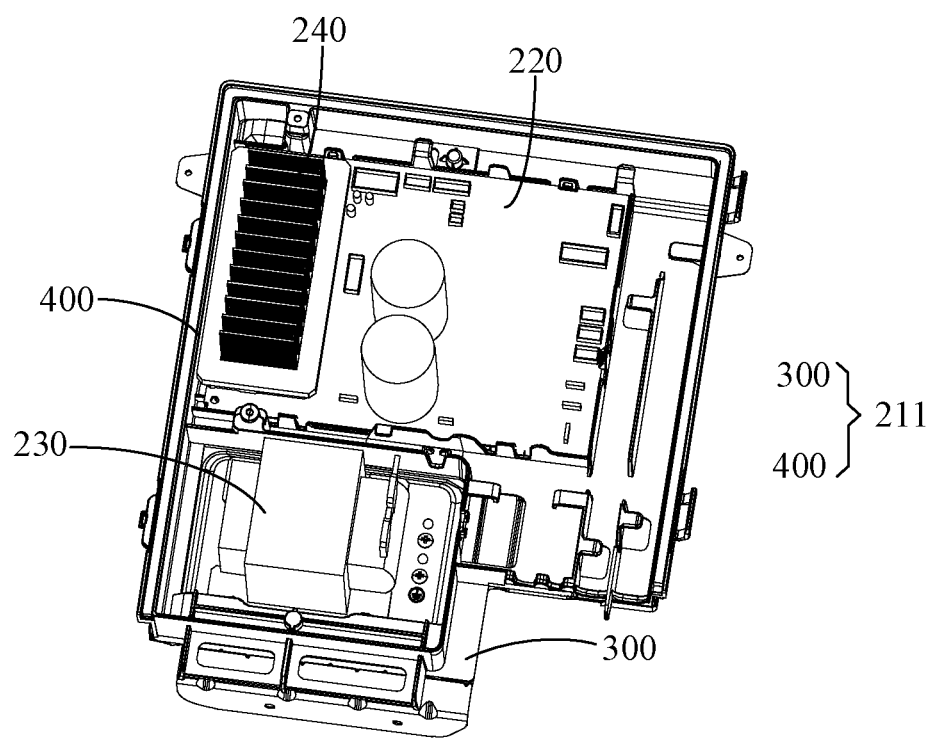
FIG. 17 is a schematic view of an inner bottom plate in FIG. 11 with electrical control components installed.

As shown in FIG. 11, FIG. 12 and FIG. 17, in an embodiment, the electric control box 200 further includes an electric control board 220 and an inductor 230 mounted at the bottom plate 211. A main cavity 601 and an auxiliary cavity 602 are formed inside the inner box cover 600. The main cavity 601 is configured for accommodating components on the electric control board 220, and the auxiliary cavity 602 is configured for accommodating the inductor 230.

Figure 24:
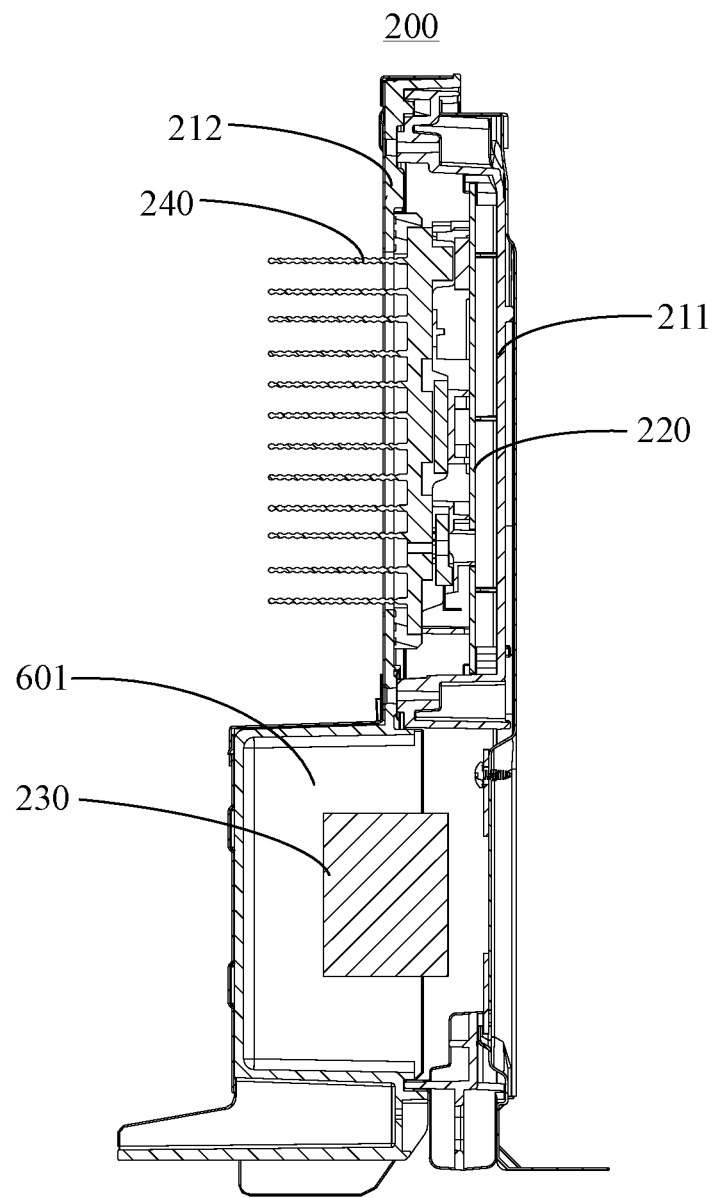
FIG. 24 is a schematic diagram of the internal structure of another embodiment of the electric control box of the present disclosure.

As shown in FIG. 17, FIG. 18 and FIG. 24, considering that during the operation of the electric control box 200, the electric control board 220 will generate a large amount of heat. If the heat is not discharged in time, the temperature inside the electric control box 200 will be too high and the electric control board 220 will be burned out. Based on this, the bottom plate 211 includes an outer bottom plate 300 and an inner bottom plate 400, the inner bottom plate 400 is hollowed out at a position corresponding to the electric control board 220, so that a heat dissipation area is formed between the electric control board 220 and the outer bottom plate 300.

Since the outer bottom plate 300 is made of metal and the inner bottom plate 400 is made of plastic, the heat transfer efficiency of the outer bottom plate 300 is higher than that of the inner bottom plate 400 due to the performance difference of different materials. Therefore, the position of the inner bottom plate 400 corresponding to the electric control board 220 is hollowed out, such that a heat dissipation area is formed between the electric control board 220 and the outer bottom plate 300, so that the electric control board 220 directly radiates heat to the outer bottom plate 300 through the heat dissipation gap, and finally radiates out through the outer bottom plate 300.

A grid bracket 440 is formed at the hollowed-out position 410 of the inner bottom plate 400, and the grid bracket 440 is configured to separate the outer bottom plate 300, which can prevent the outer bottom plate 300 from being dented toward the hollowed-out position 410 by the external pressing force and contacting the electric control board. Therefore, the overheating of the outer bottom plate 300 and the occurrence of electric leakage accidents of the electric control board 220 through the outer bottom plate 300 can be avoided, and the safety performance of the electric control box 200 can be improved.

Figure 25:
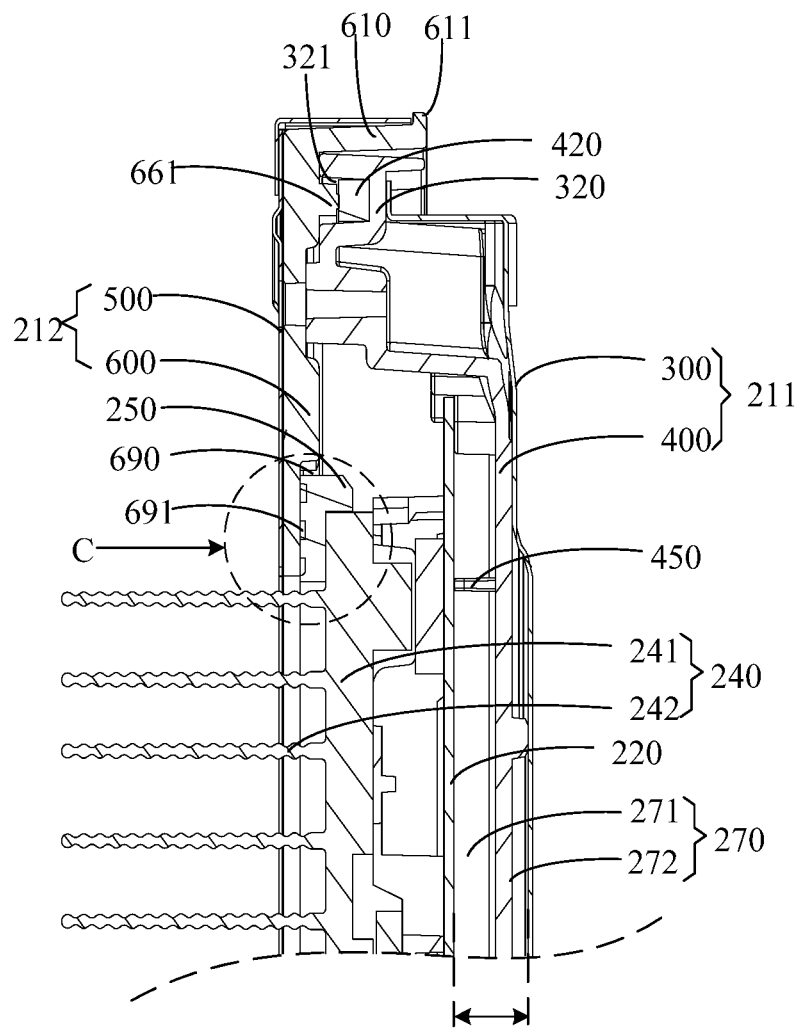
FIG. 25 is a partial structural schematic view of the electric control box in FIG. 24.

As shown in FIG. 24 and FIG. 25, based on the above embodiments, theoretically speaking, the larger the distance between the electric control board 220 and the outer bottom plate 300 (as shown by D2 in FIG. 25), the better the heat dissipation. However, the space inside the electric control box 200 will be additionally occupied accordingly, so that the overall volume of the electric control box 200 will be increased. Therefore, the distance between the electric control board 220 and the outer bottom plate 300 should be kept within a certain range.

After research, it is found that when the distance between the electric control board 220 and the outer bottom plate 300 is not less than 8 mm and not more than 18 mm, a larger gap can be obtained between the electric control board 220 and the outer bottom plate 300, which has better heat dissipation efficiency and safety performance, and occupies less space of the electric control box 200, so the overall volume of the electric control box 200 can still be kept small. Therefore, the distance between the electric control board 220 and the outer bottom plate 300 can be selected to be no less than 8 mm and no more than 18 mm, for example but not limited to: 8 mm, 10 mm, 12 mm, 15 mm, 16 mm, 17 mm, etc. Specifically, it can be designed according to the size of the electric control board 220, and no specific limitation is set herein.

As shown in FIG. 7 and FIG. 12, in an embodiment, in order to improve the heat dissipation efficiency of the electric control box 200, a heat dissipation gap is formed between the side wall of the main cavity 601 and the outer box cover 500. A heat dissipation hole 680 corresponding to the heat dissipation gap is also formed through the side wall of the main cavity 601. The plurality of heat dissipation holes 680 are spaced apart along the up-down direction. The plurality of heat dissipation holes 680 can quickly dissipate the heat in the main cavity 601 into the gap between the inner box cover 600 and the outer box cover 500, and then dissipate outward through the outer box cover 500.

It is also considered here that the moisture in the external environment may pass through the gap on the box body 210 (such as the gap between the outer bottom plate 300 and the outer box cover 500, the electric control box 200 and the pore at the connection position of the housing of the product to which it is applied penetrate into the interior, and then enter the main cavity 601 from the heat dissipation hole 680, causing the electric control board 220 to be damaged due to moisture.

In order to avoid this situation, a water baffle 681 can protrude on the periphery of the heat dissipation hole 680, the water baffle 681 surrounds the heat dissipation hole 680, and the water baffle 681 is inclined from the inner side of the heat dissipation hole 680 to the outer side thereof. Therefore, when the water in the external environment is on the side wall of the main cavity 601, the water is blocked and guided by the water baffle 681 and then drips downward in sequence (the dashed arrow in FIG. 7 indicates the drainage direction), and then flows to the bottom of the box body 210, and finally drains from the gap at the bottom of the box body 210 to the chassis 110, so as to prevent water droplets from entering the main cavity 601 from the heat dissipation hole 680 and reduce the occurrence of the electric control board 220 being damaged by moisture.

As shown in FIG. 7, FIG. 12 and FIG. 25, in an embodiment, the electric control box 200 further includes a heat sink 240 mounted at the electric control board 220, and a sealing sleeve 250 is arranged around the heat sink 240. The inner box cover 600 is provided with an extension opening 603 for the heat sink 240 to protrude outward. A sink groove 690 is formed in the inner periphery of the extension opening 603, and the sink groove 690 corresponds to the sealing sleeve 250.

The heat sink 240 includes a base plate 241 and a plurality of heat dissipation fins 242 provided at the base plate 241, and the base plate 241 is mounted at the electric control board 220. The sealing sleeve 250 is sleeved on the base plate 241. After the electric control box 200 is assembled, the heat dissipation fins 242 of the heat sink 240 protrude outward from the extension opening 603, the sealing sleeve 250 is embedded in the sink groove 690, the sealing sleeve 250 blocks the gap between the extension opening 603 and the circumference of the heat sink 240 to prevent water in the external environment from infiltrating into the electric control box 200 through the gap.

As shown in FIG. 12, FIG. 7 and FIG. 25, further, a plurality of annular ribs 691 protrude from the surface of the sink groove 690. The plurality of the annular ribs 691 surround the circumference of the extension opening 603 in sequence, and the annular ribs 691 abut against the surface of the sealing sleeve 250. The plurality of annular ribs 691 abut against the surface of the sealing sleeve 250, so that under the pressing force of the annular ribs 691, the surface of the sealing sleeve 250 is elastically deformed, and is more closely abutted with the annular ribs 691, which can effectively reduce the gap between the heat sink 240 and the periphery of the extension opening 603, thereby reducing the infiltration of external water from the periphery of the heat sink 240 into the electric control box 200, and improving the waterproof performance of the electric control box 200.

The number of annular ribs 691 is not limited herein, and may specifically be two or more. A plurality of the annular ribs 691 are arranged in a zigzag shape along the periphery of the extension opening 603, the plurality of annular ribs 691 are matched against the surface of the sealing sleeve 250, thereby forming a multi-layered seal on the periphery of the heat sink 240, which greatly improves the sealing and waterproofing effect. The annular rib 691 can be in a regular or irregular annular design, for example, but not limited to, the annular rib 691 is designed in a polygonal shape (such as a square, a trapezoid, a pentagon, etc.), a circular design, or an oval design. In practical applications, the annular rib 691 should be consistent with the extension opening 603, which can be designed according to the specific shape and structure of the heat sink 240.

As shown in FIG. 1 to FIG. 3, the present disclosure further provides a window air conditioner 100. The window air conditioner 100 includes a chassis 110, a housing 120, an outdoor fan 160 and an electric control box 200. The specific structure of the electric control box 200 refers to the above-mentioned embodiment. Since the window air conditioner 100 adopts all the technical solutions of the above-mentioned embodiments, it also has all the beneficial effects brought by the technical solutions of the above-mentioned embodiments, which will not be repeated herein.

As shown in FIG. 1 to FIG. 3, in an embodiment, the housing 120 is mounted at the chassis 110, the housing 120 includes an outdoor housing 122 and an indoor housing 121, and the top plate of the outdoor housing 122 is provided with an outdoor air inlet 170. The outdoor fan 160 is installed in the outdoor housing 122. The electric control box 200 is installed at the outdoor housing 122, and the electric control box 200 is vertical and corresponds to the air inlet of the outdoor fan 160.

The outdoor air inlet 170 has an inlet edge 171 away from the outdoor fan 160, and a box cover 212 of the electric control box 200 corresponds to the inlet edge 171, and a water blocking member 611 of the box cover 212 is located at a side of the inlet edge 171 that faces away from the outdoor air inlet 170. Therefore, the water falling on the box cover 212 of the electric control box 200 from the outdoor air inlet 170 will be blocked by the water blocking member 611, and can only be discharged downward from the back of the box cover 212. It is difficult for water to pass over the water blocking member 611 and fall to the assembly position between the box cover 212 and the bottom plate 211, so that it is difficult to penetrate into the interior of the electric control box 200.

It is considered herein that when the water in the external environment falls on the box cover 212 of the electric control box 200 from the outdoor air inlet 170, the water droplets collide with the top wall of the outer box cover 500 to splash water droplets in the circumferential direction, and these splashed water droplets may cross the water blocking member 611. Therefore, in order to prevent the splashing water droplets from crossing the water blocking member 611, the distance between the water blocking member 611 and the inlet edge 171 is defined to be not less than 6 mm.

Figure 22:
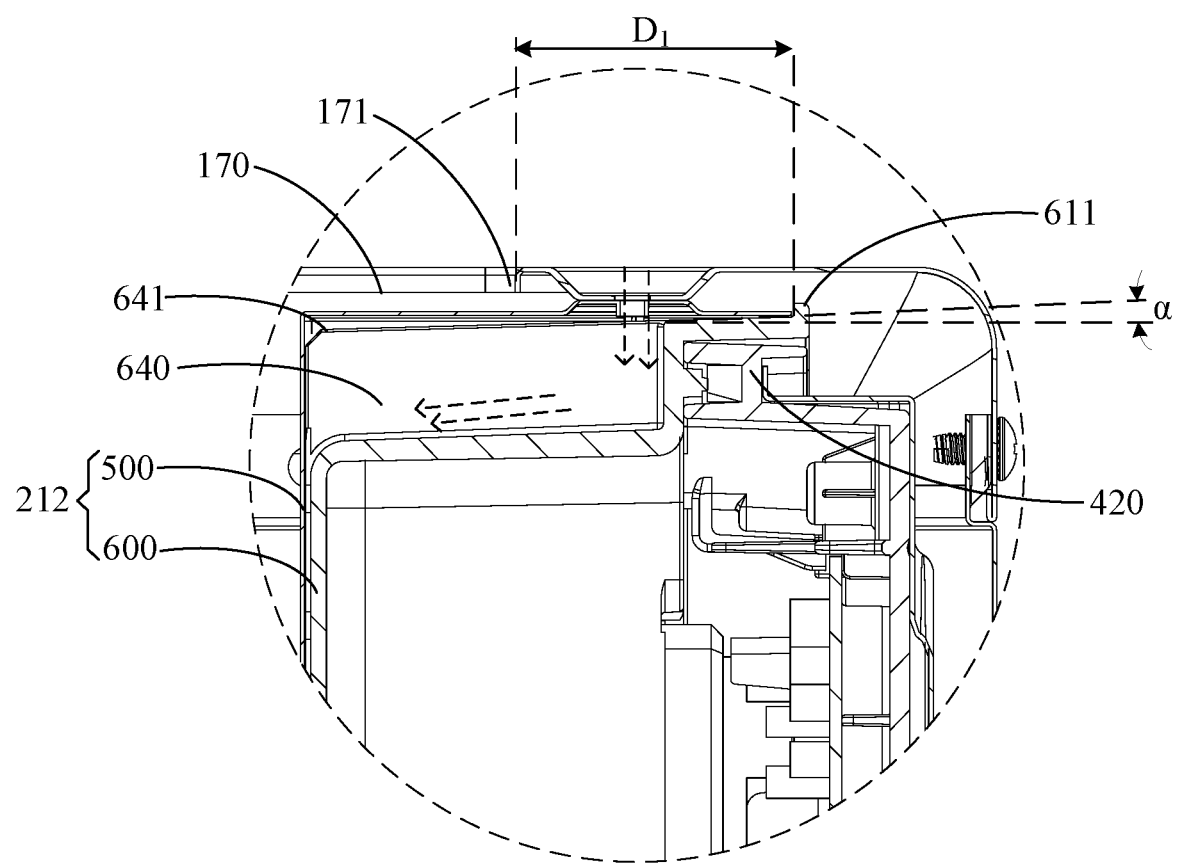
FIG. 22 is a schematic view of the inclination angle of the upper cover plate of the inner box cover in FIG. 21.

As shown in FIG. 20 to FIG. 22, the dashed arrow in FIG. 22 indicates the drainage direction, and D1 indicates the distance between the water blocking member 611 and the inlet edge 171, that is, D1 is greater than or equal to 6 mm. The radius of the splashed water droplets spreading around is usually less than 6 mm. The distance between the water blocking member 611 and the inlet edge 171 is not less than 6 mm, such that when the splashed water droplets do not cross the water blocking member 611, they fall on the top wall of the outer box cover 500 again, and then flow away from the top wall of the outer box cover 500 to the back thereof.

The distance between the water blocking member 611 and the inlet edge 171 is not as large as possible. The larger the distance, the larger the space occupied by the electric control box 200, which is not conducive to saving installation space. Therefore, it is defined here that the distance between the water blocking member 611 and the inlet edge 171 is not greater than 50 mm, that is, D1 is greater than or equal to 6 mm, and less than or equal to 50 mm. D1 can be, but not limited to: 6 mm, 10 mm, 15 mm, 20 mm, 25 mm, 30 mm, 35 mm, 40 mm, 45 mm, 48 mm, and the like.

D1 is greater than or equal to 6 mm, and less than or equal to 50 mm, such that it is difficult for the splashed water droplets to cross the water blocking member 611, and the space occupied by the control box is also small, which facilitates the installation of the electric control box 200 in the narrow space on the air inlet of the outdoor fan 160. It should be noted that the inlet edge 171 may be straight or a non-straight. When the rear side of the tuyere is non-straight, the distance between the water blocking member 611 and the inlet edge 171 shall refer to the minimum distance between the water blocking member 611 and the inlet edge 171.

If the electric control box 200 is only connected and fixed with the chassis 110 through its bottom, and the top of the electric control box 200 is not fixed, during the process of transferring the window air conditioner 100, the electric control box 200 may swing back and forth and collide with its adjacent components (such as the outdoor fan 160 or the fan bracket 170). As a result, the fire-proof or anti-rust coating on the surface of the electric control box 200 is scratched, and there is a great potential safety hazard.

In an embodiment, in order to reduce the occurrence of the above situation, the top plate of the outdoor housing 122 is provided with a fixation member 180, and the fixation member 180 is suitable for connecting and fixing with the installation member 580 on the top of the electric control box 200 through a connection member. Specifically, the fixation member 180 is provided with a through hole, the installation member 580 is provided with a docking hole, and the electric control box 200 and the outdoor housing 122 are connected and fixed by using a connection member to pass through the through hole and the docking hole in sequence. The connection member may be a screw. The installation member 580 protrudes from the top surface of the electric control box 200, which can reduce the penetration of external water into the interior of the electric control box 200 from the docking hole of the installation member 580.

After the top of the electric control box 200 is connected to the fixation member 180 of the outdoor housing 122 through the installation member 580, the position of the top of the electric control box 200 is fixed. That is, both the bottom and the top of the electric control box 200 are fixed, so that the electric control box 200 is not easy to swing, thereby reducing the occurrence of collision between the electric control box 200 and its adjacent components.

Figure 29:
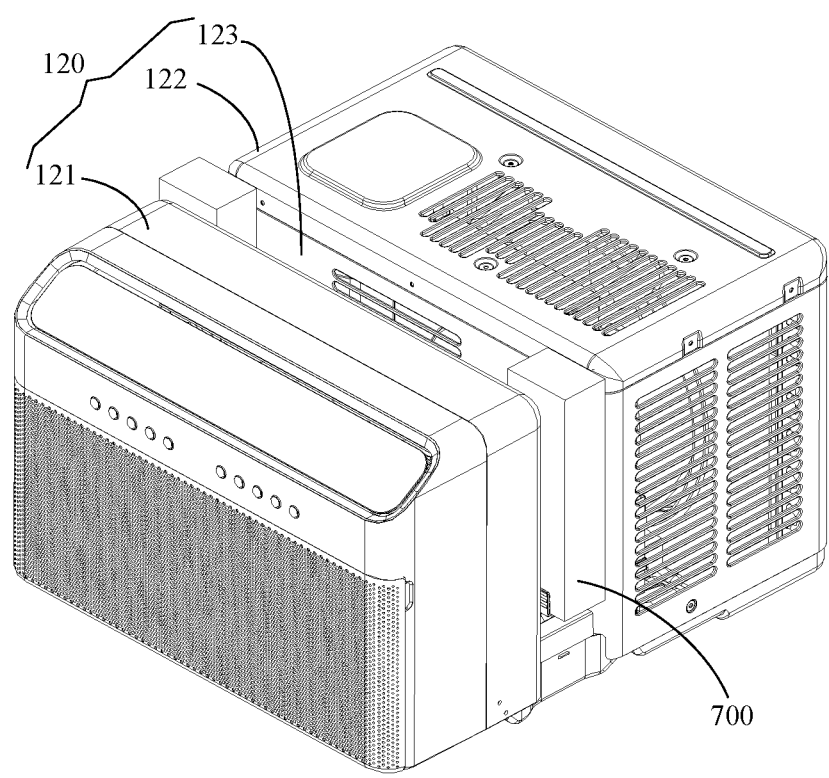
FIG. 29 is a schematic structural view of the window air conditioner according to still another embodiment of the present disclosure, with a sealing member in a storage state.

As shown in FIG. 1 and FIG. 29, in an embodiment, the housing 120 is mounted at the chassis 110, the housing 120 is provided with a partition groove 123 into which the shielding member at the window extends, the housing 120 is divided into an indoor housing 121 and an outdoor housing 122 by the partition groove 123. The outdoor fan 160 is installed at the outdoor housing 122. The electric control box 200 is installed in the outdoor housing 122. The electric control box 200 is arranged vertically, and the heat sink 240 of the electric control box 200 faces the outdoor fan 160.

The partition groove 123 is configured for the shielding member located at the window of the wall to extend into. After the window air conditioner 100 is installed at the window of the wall, the outdoor box cover 212 is located outdoors, and the indoor box cover 212 is located indoors, which can block the noise generated by the outdoor components from propagating to the indoor and achieve the noise reduction effect. Then, the shielding member is pulled down to extend into the partition groove 123 of the window air conditioner 100, the shielding member shields the gap between the two sides of the window air conditioner 100 and the side wall of the window, thereby reducing the leakage of indoor cooling or heat from the space to the outdoors. It should be noted that the shielding member can be a window sash, or a window blind, or a curtain, etc. that shields light, or other protective window panels that can shield external objects from entering the room.

The window air conditioner 100 further includes an indoor heat exchanger 130, an outdoor heat exchanger 140, an indoor fan 150 and an outdoor fan 160. The indoor heat exchanger 130 and the indoor fan 150 are installed in the indoor housing 121; the outdoor heat exchanger 140 and the outdoor fan 160 are installed in the outdoor housing 122. When the window air conditioner 100 works, the indoor fan 150 drives the indoor air into the indoor housing 121 to exchange heat with the indoor heat exchanger 130, and blows the heat-exchanged air from the indoor housing 121 to the indoor environment, so as to achieve cooling and heating of the indoor environment. Meanwhile, the outdoor fan 160 drives the outdoor air into the outdoor housing 122 to exchange heat with the outdoor heat exchanger 140, and blows the heat-exchanged air from the outdoor housing 122 to the outdoor environment. The electric control box 200 is vertically installed in the outdoor housing 122, and the electric control box 200 is located at the air intake side of the outdoor fan 160, such that when the window air conditioner 100 works, the airflow driven by the outdoor fan 160 will pass around the electric control box 200, thereby taking away part of the heat generated by the electric control box 200.

Figure 30:
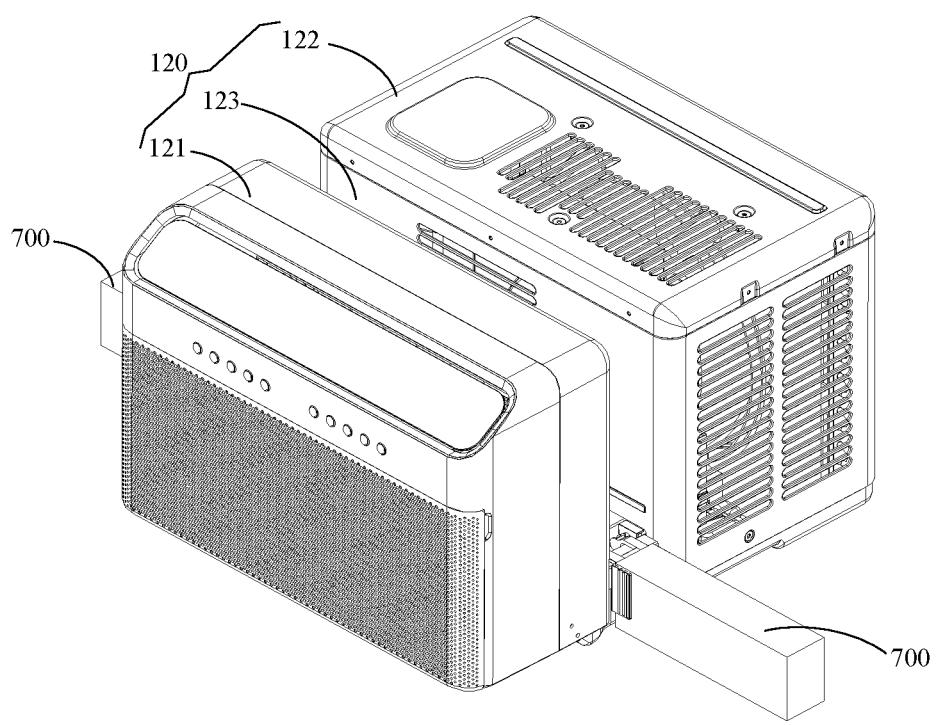
FIG. 30 is a schematic view of the sealing member of the window air conditioner in FIG. 29 being switched to a working state.

As shown in FIG. 29 and FIG. 30, in an embodiment, the window air conditioner 100 further includes a sealing member 700 movably mounted in the partition groove 123, the sealing member 700 is movable to switch between a storage state and a working state. The sealing member 700 is stored in the partition groove 123 in the storage state; and the sealing member 700 protrudes laterally from the partition groove 123, and is configured for the shielding member and/or an inner wall of the window to abut against in the working state.

After the window air conditioner 100 is installed at the window, the sealing member 700 is moved to the working state, such that the sealing member 700 protrudes laterally from the partition groove 123 of the window air conditioner 100, and the bottom surface of the sealing member 700 abuts against the bottom wall of the window. Then, the shielding member is pulled down to extend into the partition groove 123 of the window air conditioner 100 until the lower edge of the shielding member comes into contact with the separation member and the sealing member 700. The sealing member 700 shields and seals the gap between the shielding member and the bottom wall of the window, so as to reduce the leakage of indoor cooling or heat from the gap to the outdoor. When the window air conditioner 100 is not needed or transported, the sealing member 700 is moved to the storage state, which reduces the space occupied by the sealing member 700 and facilitates the storage or packaging of the window air conditioner 100.

The sealing member 700 can be installed in a variety of ways. For example, the sealing member 700 is slidably installed at the partition groove 123; or, the sealing member 700 is rotatably installed at the partition groove 123; or, the sealing member 700 can be elastically and retractably installed at the partition groove 123. The sealing member 700 is rotatably installed at the partition groove 123 to switch between the working state and the storage state.

As shown in FIG. 4, FIG. 24 and FIG. 25, in an embodiment of the present disclosure, the electric control box 200 includes a box body 210 and an electric control board 220. The box body 210 includes a bottom plate 211 and a box cover 212 adapted to cover the bottom plate 211. The bottom plate 211 includes an outer metal bottom plate 300 and an inner plastic bottom plate 400, and the electric control board 220 is mounted at the inner plastic bottom plate 400. The inner plastic bottom plate 211 is hollowed out at a position corresponding to the electric control board 220, so that a heat dissipation area 270 is formed between the electric control board 220 and the outer metal bottom plate 300.

The box cover 212 of the box body 210 also includes an outer metal box cover 500 and an inner plastic box cover 600. That is to say, the box body 210 of the electric control box 200 actually has an inner part and an outer part. The inner part is composed of an inner plastic bottom plate 400 and an inner plastic box cover 600. The inner part is made of plastic, which is easy to manufacture and has low manufacturing cost. The outer part is composed of the outer metal bottom plate 300 and the outer metal box cover 500. The outer part is made of sheet metal parts, which can play the role of fire prevention and rust prevention, so that the electric control box 200 has high safety performance. When assembling the electric control box 200, the electric control board 220 is first installed at the bottom plate 211; then, the box cover 212 is covered on the bottom plate 211.

Due to the performance difference of materials, the heat transfer efficiency of the outer metal bottom plate 300 is greater than that of the inner plastic bottom plate 400. If the position of the inner plastic bottom plate 400 corresponding to the electric control board 220 is not hollowed out, the heat generated by the electric control box 200 needs to be transferred to the inner plastic bottom plate 400 first, and then transferred to the outer metal bottom plate 300 through the inner plastic bottom plate 400, which results in poor heat dissipation efficiency.

In technical solutions of the present disclosure, the position of the inner plastic bottom plate 211 corresponding to the electric control board 220 is hollowed out, such that a heat dissipation area 270 is formed between the electric control board 220 and the outer metal bottom plate 300, the electric control board 220 radiates heat to the outer metal bottom plate 300 directly through the heat dissipation area 270, and finally radiates heat to the outside through the outer metal bottom plate 300. The existence of the heat dissipation area 270 means that there is a certain distance between the electric control board 220 and the outer metal bottom plate 300, this distance can prevent the electric control board 220 from contacting the outer metal bottom plate 300, thereby preventing the electric control board 220 from leaking electricity through the outer metal bottom plate 300, and improving the safety performance of the electric control box 200.

Figure 5:
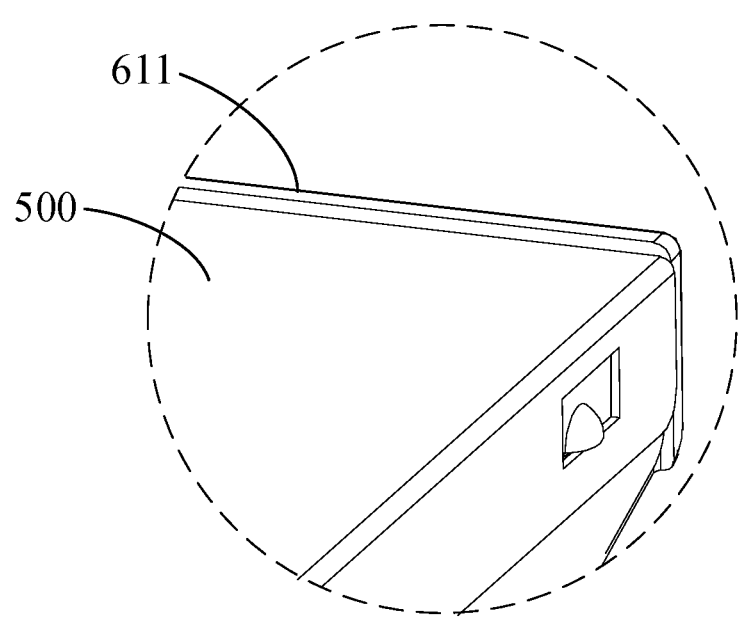
FIG. 5 is an enlarged view of portion A in FIG. 4.
Figure 6:
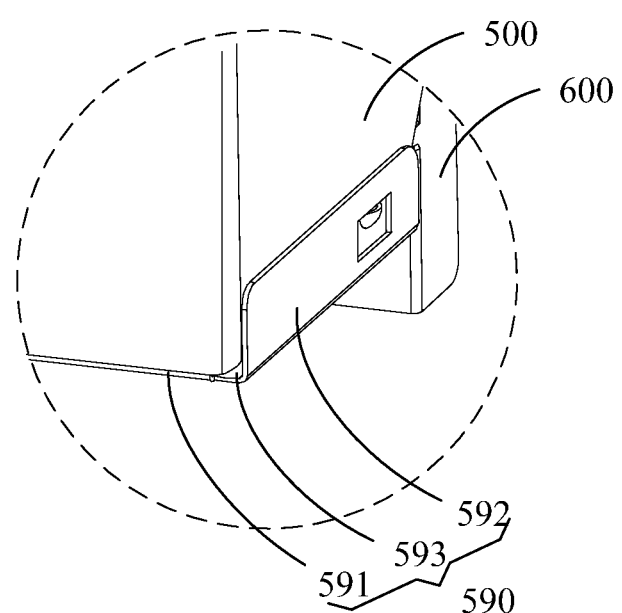
FIG. 6 is an enlarged view of portion D in FIG. 4.

As shown in FIG. 4, FIG. 24 and FIG. 25, since the heat dissipation area 270 is formed between the electric control board 220 and the outer metal bottom plate 300, the electric control board 220 and the outer metal bottom plate 300 are spaced apart. In FIG. 5, D1 represents the distance between the electric control board 220 and the outer metal bottom plate 300. Theoretically speaking, the larger D1 is, the more conducive to the passage of airflow to achieve rapid heat dissipation. However, the space inside the electric control box 200 will be additionally occupied accordingly, so that the overall volume of the electric control box 200 will be increased. Therefore, D1 should be kept within a certain range.

After research, it is concluded that when the distance between the electric control board 220 and the outer metal bottom plate 300 is not less than 8 mm and not more than 18 mm, a larger gap can be obtained between the electric control board 220 and the outer metal bottom plate 300, which has better heat dissipation efficiency and safety performance. In addition, the space occupied by the electric control box 200 is small, so the overall volume of the electric control box 200 can still be kept small. Therefore, the distance between the electric control board 220 and the outer metal bottom plate 300 can be selected to be not less than 8 mm and not more than 18 mm, for example but not limited to: 8 mm, 10 mm, 12 mm, 15 mm, 16 mm, 17 mm, etc. Specifically, it can be designed according to the size of the electric control board 220, and no specific limitation is set herein.

Further, the distance between the electric control board 220 and the outer metal bottom plate 300 can also be selected to be not less than 10 mm and not more than 15 mm. When the distance is within this range, the efficiency of the electric control board 220 radiating heat to the outer metal bottom plate 300 is better. It is relatively difficult to form the heat dissipation area 270 between the inner plastic bottom plate 400 and the outer metal bottom plate 300, which is easy to manufacture. The specific value of the distance may be, but not limited to, 10 mm, 11 mm, 12 mm, 13 mm, 14 mm, and the like.

As shown in FIG. 11, FIG. 17 and FIG. 18, in an embodiment, the inner plastic bottom plate 400 is formed with a grid bracket 440 at the hollowed-out position 410, and the grid bracket 440 separates the electric control board 220 from the outer metal bottom plate 300. The grid bracket 440 is integrally formed with the inner plastic bottom plate 400. The grid bracket 440 includes a plurality of grid bars arranged in a crisscross pattern. The grid bracket 440 can increase the strength of the hollowed-out position 410 of the inner plastic bottom plate 400, so that the inner plastic bottom plate 400 can strongly support electric control assemblies such as the electric control board 220.

Besides, when the electric control box 200 is used for a period of time or when external components are pressed against the outer metal bottom plate 300, the outer metal bottom plate 300 may be deformed toward the heat dissipation area 270. However, if the deformed position of the outer metal bottom plate 300 contacts the electric control board 220, the electric control board 220 may leak electricity through the outer metal bottom plate 300, posing a potential safety hazard. After the hollowed-out position 410 of the inner plastic bottom plate 400 is provided with a grid bracket 440, even if the outer metal bottom plate 300 is deformed toward the heat dissipation area 270, the deformed position of the outer metal bottom plate 300 will be blocked by the grid bracket 440, so that it is difficult to contact the electric control board 220, thereby reducing the occurrence of potential safety hazards.

As shown in FIG. 11, FIG. 17 and FIG. 25, in an embodiment, the grid bracket 440 and the electric control board 220 are spaced apart, and the heat dissipation area 270 includes an inner heat dissipation area 271 formed between the grid bracket 440 and the electric control board 220. That is to say, the back of the electric control board 220 does not contact the grid bracket 440, therefore, the shielding of the back of the electric control board 220 by the grid bracket 440 can be reduced, so that the back of the electric control board 220 forms a larger heat dissipation surface. The heat generated by the electric control board 220 is conducted to the outer metal bottom plate 300 through the inner heat dissipation area 271, and then dissipated through the outer metal bottom plate 300.

Further, the inner plastic bottom plate 400 is provided with a plurality of support members 450 protruding therefrom and around the hollowed-out position 410, and the plurality of the support members 450 cooperate to support the electric control board 220, such that the inner heat dissipation area 271 is formed between the grid bracket 440 and the electric control board 220. The plurality of support members 450 are protrusions formed at the surface of the inner plastic bottom plate 400. A plurality of the support members 450 are spaced apart around the hollowed-out positions 410 of the inner plastic bottom plate 400.

As shown in FIG. 11, FIG. 17 and FIG. 25, in an embodiment, the grid bracket 440 and the outer metal bottom plate 300 are spaced apart; the heat dissipation area 270 includes an outer heat dissipation area 272 formed between the grid bracket 440 and the outer metal bottom plate 300. That is to say, the grid bracket 440 is not in contact with the outer metal bottom plate 300 either. The heat generated by the electric control board 220 is conducted to the outer metal bottom plate 300 through the inner heat dissipation area 271 and the outer heat dissipation area 272, and then dissipated through the outer metal bottom plate 300. The existence of the outer heat dissipation area 272 increases the safety distance between the electric control board 220 and the outer metal bottom plate 300, which can greatly improve the safety performance of the electric control box 200.

Further, the outer metal bottom plate 300 is recessed from the inside to the outside at a position corresponding to the electric control board 220, so that a groove 510 is formed at the recessed position. The outer metal bottom plate 300 forms the outer heat dissipation area 272 between the bottom surface of the groove 510 and the grid bracket 440. Since the thickness of the outer metal bottom plate 300 is small and has better ductility, the manner in which the outer metal bottom plate 300 is recessed from the inside to the outside to form the outer heat dissipation area 272 is easier to manufacture, and the production efficiency is higher. In addition, the outer metal bottom plate 300 is formed with a groove 510, which can enhance the strength of the outer metal bottom plate 300, such that the outer metal bottom plate 300 is not easily deformed into the electric control board 220, so as to prevent the outer metal bottom plate 300 from directly contacting the electric control board 220 and improve the safety performance of the electric control box 200.

As shown in FIG. 11 to FIG. 17, based on any one of the above embodiments, a main cavity 601 is provided inside the inner plastic box cover 600, and the main cavity 601 is suitable for accommodating components on the power supply control board 220. Considering that the main heat source of the electric control box 200 comes from the electric control board 220, and the heat transfer efficiency of the inner plastic box cover 600 is low, it is not conducive to heat dissipation. Therefore, a plurality of heat dissipation holes 680 may be formed through the inner plastic box cover 600 on the side wall corresponding to the main cavity 601.

The plurality of heat dissipation holes 680 are spaced apart along the up-down direction. The plurality of heat dissipation holes 680 can quickly dissipate the heat in the main cavity 601 into the gap between the inner plastic box cover 600 and the outer metal box cover 500, and then dissipate outward through the outer metal box cover 500.

Besides, moisture in the external environment may penetrate into the interior through the gap (for example, the gap between the outer metal bottom plate 300 and the outer metal box cover 500, or the gap where the electric control box 200 is connected to the housing of the product to which it is applied) on the box body 210, and then enter the main cavity 601 through the heat dissipation holes 680, causing the electric control board 220 to be damaged due to moisture.

In order to avoid this situation, a water baffle 681 can protrude on the periphery of the heat dissipation hole 680, the water baffle 681 surrounds the heat dissipation hole 680, and the water baffle 681 is inclined from the inner side of the heat dissipation hole 680 to the outer side thereof. Therefore, when the water in the external environment falls on the side wall of the main cavity 601, the water is blocked and guided by the water baffle 681 and drips downward in sequence, and then flows to the bottom of the box body 210, and finally is discharged from the gap at the bottom of the box body 210 to the chassis 110. Therefore, water droplets can be prevented from entering the main cavity 601 from the heat dissipation holes 680, and the occurrence of failure of the electric control board 220 due to moisture is reduced.

In an embodiment, the electric control box 200 further includes an inductor 230, and the inductor 230 passes through the inner plastic bottom plate 400 and is fixed on the outer metal bottom plate 300. The inner plastic box cover 600 is provided with an auxiliary cavity 602, and the auxiliary cavity 602 is suitable for accommodating the inductor 230.

The outer metal bottom plate 300 is made of sheet metal parts, so compared with the inner plastic bottom plate 400, the outer metal bottom plate 300 has higher strength and is less prone to bending. Therefore, the inductor 230 is fixed on the outer metal bottom plate 300, so that the outer metal bottom plate 300 can strongly support the inductor 230, and the outer metal bottom plate 300 is not easily deformed. The electric control box 200 further includes a heat sink 240. The heat sink 240 is mounted at one end of the electric control board 220 and protrudes outward from the box cover 212.

As shown in FIG. 1, the present disclosure further provides a window air conditioner 100. The window air conditioner 100 includes a chassis 110, a housing 120, an outdoor fan 160 and an electric control box 200. The specific structure of the electric control box 200 refers to the above-mentioned embodiments. Since the window air conditioner 100 adopts all the technical solutions of the above-mentioned embodiments, it also has all the beneficial effects brought by the technical solutions of the above-mentioned embodiments, which will not be repeated here.

In an embodiment, the housing 120 is installed at the chassis 110, and the housing 120 is configured with a partition groove 123 for the shielding member at the window to extend into. The housing 120 is divided into an indoor housing 121 and an outdoor housing 122 by the partition groove 123. The outdoor fan 160 is installed in the outdoor housing 122, the electric control box 200 is installed in the outdoor housing 122, the electric control box 200 is arranged vertically, and the box cover 212 of the electric control box 200 faces the outdoor fan 160. Specifically, the partition groove 123 is suitable for the shielding member located at the window of the wall to extend into. After the window air conditioner 100 is installed at the window of the wall, the outdoor box cover 212 is located outdoors, and the indoor box cover 212 is located indoors, which can block the noise generated by the outdoor components from propagating to the indoor and achieve the noise reduction effect. Then, the shielding member is pulled down to extend into the partition groove 123 of the window air conditioner 100, the shielding member shields the gap between the two sides of the window air conditioner 100 and the side wall of the window, thereby reducing the leakage of indoor cooling or heat from the space to the outdoors. It should be noted that the shielding member can be a window sash, or a window blind, or a curtain, etc. that shields light, or other protective window panels that can shield external objects from entering the room.

As shown in FIG. 1, the window air conditioner 100 further includes an indoor heat exchanger 130, an outdoor heat exchanger 140, an indoor fan 150 and an outdoor fan 160. The indoor heat exchanger 130 and the indoor fan 150 are installed in the indoor housing 121; the outdoor heat exchanger 140 and the outdoor fan 160 are installed in the outdoor housing 122. When the window air conditioner 100 works, the indoor fan 150 drives the indoor air into the indoor housing 121 to exchange heat with the indoor heat exchanger 130, and blows the heat-exchanged air from the indoor housing 121 to the indoor environment, so as to achieve cooling and heating of the indoor environment. Meanwhile, the outdoor fan 160 drives the outdoor air into the outdoor housing 122 to exchange heat with the outdoor heat exchanger 140, and blows the heat-exchanged air from the outdoor housing 122 to the outdoor environment. The electric control box 200 is vertically installed in the outdoor housing 122, and the electric control box 200 is located at the air intake side of the outdoor fan 160, such that when the window air conditioner 100 works, the airflow driven by the outdoor fan 160 will pass around the electric control box 200, thereby taking away part of the heat generated by the electric control box 200.

Figure 28:
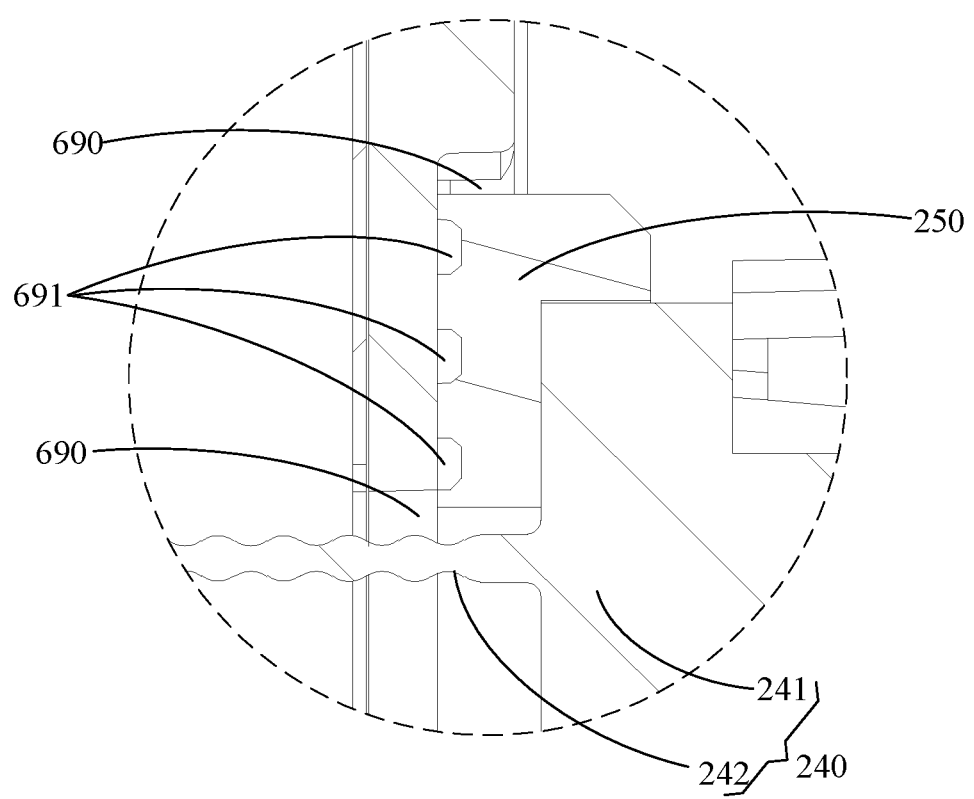
FIG. 28 is a schematic view of yet another embodiment of the annular rib in FIG. 26.

As shown in FIG. 28 and FIG. 29, in an embodiment, the window air conditioner 100 further includes a sealing member 700 movably mounted in the partition groove 123, the sealing member 700 is movable to switch between a storage state and a working state. The sealing member 700 is stored in the partition groove 123 in the storage state; and the sealing member 700 protrudes laterally from the partition groove 123, and is configured for the shielding member and/or an inner wall of the window to abut against in the working state.

After the window air conditioner 100 is installed at the window, the sealing member 700 is moved to the working state, such that the sealing member 700 protrudes laterally from the partition groove 123 of the window air conditioner 100, and the bottom surface of the sealing member 700 abuts against the bottom wall of the window. Then, the shielding member is pulled down to extend into the partition groove 123 of the window air conditioner 100 until the lower edge of the shielding member comes into contact with the separation member and the sealing member 700. The sealing member 700 shields and seals the gap between the shielding member and the bottom wall of the window, so as to reduce the leakage of indoor cooling or heat from the gap to the outdoor. When the window air conditioner 100 is not needed or not transported, the sealing member 700 is moved to the storage state, which reduces the space occupied by the sealing member 700 and facilitates the storage or packaging of the window air conditioner 100. The sealing member 700 can be installed in a variety of ways. For example, the sealing member 700 is slidably installed at the partition groove 123; or, the sealing member 700 is rotatably installed at the partition groove 123; or, the sealing member 700 can be elastically and retractably installed at the partition groove 123. The sealing member 700 is rotatably installed at the partition groove 123 to switch between the working state and the storage state.

As shown in FIG. 4, FIG. 12 and FIG. 17, in an embodiment of the present disclosure, the electric control box 200 includes a box body 210, an electric control assembly and a sealing sleeve 250. The box body 210 includes a bottom plate 211 and a box cover 212 adapted to cover the bottom plate 211. The electric control assembly is mounted at the bottom plate 211, and the electric control assembly includes an electric control board 220 and a heat sink 240 mounted at the electric control board 220. The sealing sleeve 250 is sleeved around the circumference of the heat sink 240. The box cover 212 is provided with an extension opening 510 corresponding to the heat sink 240 extending outward. A sink groove 690 is formed at the inner surface of the box cover 212 on the periphery of the extension opening 510, and the sink groove 690 is adapted to fit with the sealing sleeve 250. Specifically, the box body 210 of the electric control box 200 is enclosed by the bottom plate 211 and the box cover 212 to form a cavity for accommodating the electric control assemblies. The electric control assembly is mounted at the bottom plate 211, and the electric control board 220 in the electric control assembly is provided with components such as capacitors, and the heat sink 240 is mounted at one end of the electric control board 220. The inner plastic box cover 600 of the box cover 212 is provided with a main cavity 601 and an auxiliary cavity 602 located below the main cavity 601. The main cavity 601 is used for accommodating components (such as capacitors, etc.) on the electric control board 220, and the auxiliary cavity 602 is used for accommodating the inductor 230. The box cover 212 is configured to form the extension opening 510 on one side of the main cavity 601. The extension opening 510 is located above the auxiliary cavity 602, so that the heat sink 240 can protrude from the extension opening 510 to the outside of the box body 210.

The box cover 212 is provided with the extension opening 510 on one side of the main cavity 601, and a sink groove 690 is formed around the extension opening 510. After the electric control box 200 is assembled, the heat sink 240 protrudes outward from the extension opening 510 of the box cover 212, the sealing sleeve 250 which is ring-sleeved around the heat sink 240 is correspondingly embedded in the sink groove 690, which can not only limit the sealing sleeve 250, but also avoid displacement of the sealing sleeve 250. An L-shaped sealing surface can also be formed between the sink groove 690 and the peripheral edge of the sealing cover, so that water in the external environment is not easily penetrated from the L-shaped sealing surface, which can effectively improve the sealing and waterproofing effect.

In technical solutions of the present disclosure, a sink groove 690 is formed at the circumference of the extension opening 510, such that after the electric control box 200 is assembled, the sealing sleeve 250 is correspondingly embedded in the sink groove 690, which can not only limit the sealing sleeve 250, but also prevent the sealing sleeve 250 from shifting. An L-shaped sealing surface can also be formed between the sink groove 690 and the peripheral edge of the sealing cover, so that water in the external environment is not easily penetrated from the L-shaped sealing surface, which can effectively improve the sealing and waterproofing effect.

Figure 26:
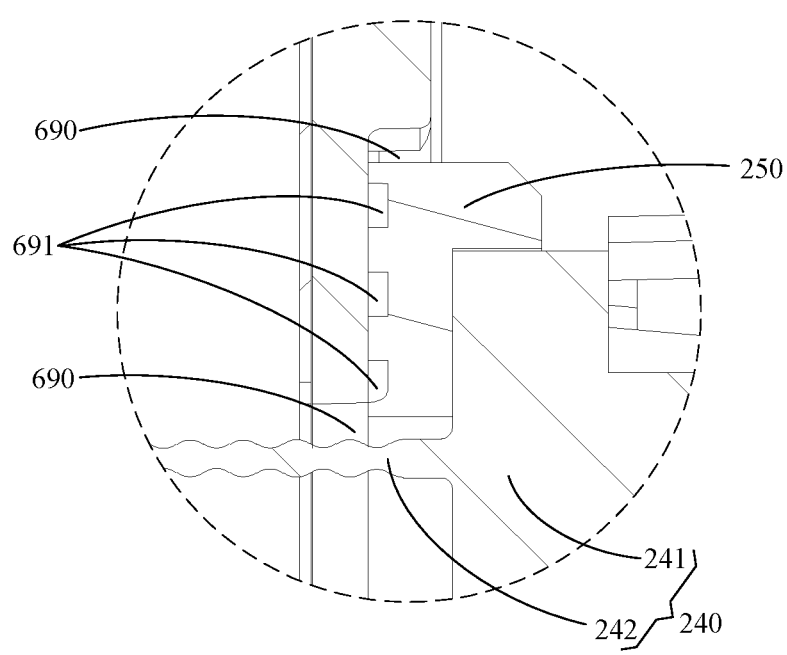
FIG. 26 is an enlarged view of portion C in FIG. 25.

As shown in FIG. 17, FIG. 25 and FIG. 26, in an embodiment, the heat sink 240 includes a base plate 241 mounted at the electric control board 220, and a plurality of heat dissipation fins 242 provided at the base plate 241. The sealing sleeve 250 includes a main body and a wrapping edge formed at the periphery of the main body, and the sealing sleeve 250 is wrapped on the base plate 241 by the wrapping edge.

The base plate 241 of the heat sink 240 is fixed on the electric control board 220, and the plurality of the heat dissipation fins 242 of the heat sink 240 protrude outward from the extension opening 510. The main body of the sealing sleeve 250 is provided with an opening for the cooling fins 242 of the heat sink 240 to pass through. The sealing sleeve 250 is directly wrapped on the base plate 241 of the heat sink 240 through the wrapping edge around the main body. There is no need to configure other fixing structures (such as installation grooves, fixing parts, etc.), the assembly operation is simple, and rapid assembly can be achieved, thereby improving production efficiency.

The shape of the heat dissipation fins 242 can be designed in various ways. For example, the surfaces of the heat dissipation fins 242 are provided in a corrugated shape; or, the heat dissipation fins 242 are provided in a flat sheet shape. Optionally, the surfaces of the heat dissipation fins 242 are arranged in a corrugated shape, so that the heat dissipation fins 242 can obtain a larger heat dissipation surface area, thereby improving the heat dissipation efficiency of the heat sink 240. To avoid fixing the sealing sleeve 250, optionally, the sealing sleeve 250 is sleeved on the base plate 241.

As shown in FIG. 5 to FIG. 11, in an embodiment, a plurality of annular ribs 691 protrude from the surface of the sink groove 690. A plurality of the annular ribs 691 surround the circumference of the extension opening 510 in sequence, and the annular ribs 691 abut against the surface of the sealing sleeve 250. After the sealing sleeve 250 is inserted into the sink groove 690, the sealing sleeve 250 abuts against the annular rib 691 on the surface of the sink groove 690.

Since the sealing sleeve 250 is usually made of elastic materials such as rubber or silicone, the sealing sleeve 250 will elastically deform under the pressing force of the annular rib 691. In this way, the sealing sleeve 250 and the annular rib 691 more closely abut against each other, so that the gap between the heat sink 240 and the periphery of the extension opening 510 can be effectively reduced.

Figure 27:
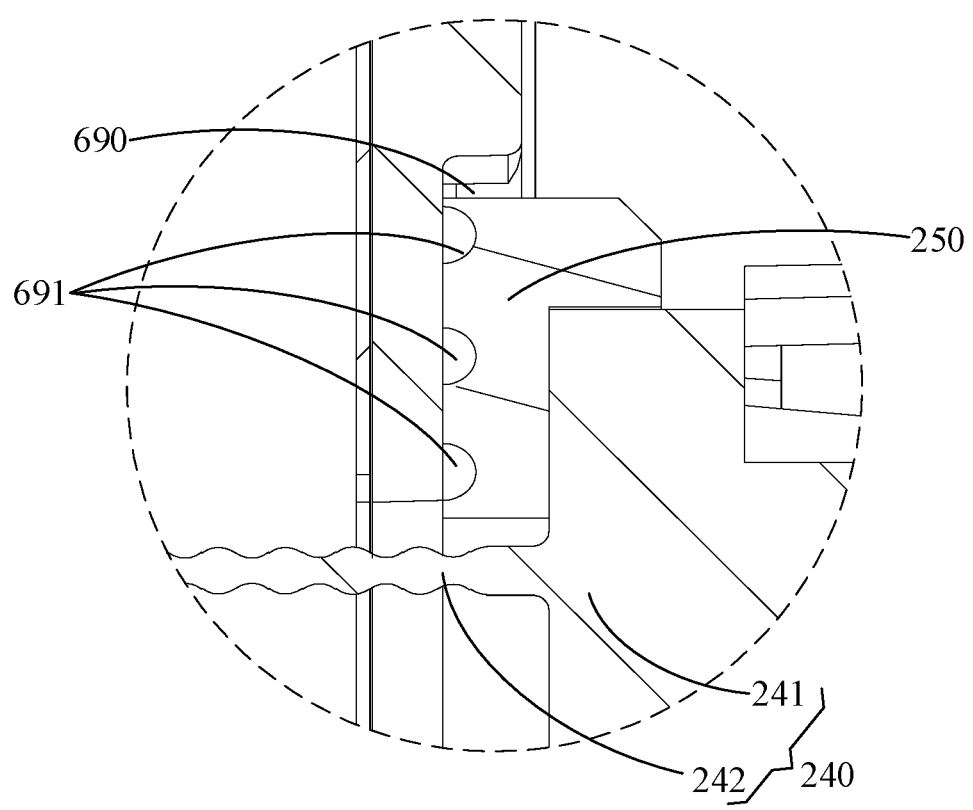
FIG. 27 is a schematic view of another embodiment of an annular rib in FIG. 26.

Further, in order to make the annular rib 691 press the sealing sleeve 250 more tightly, the cross section of the annular rib 691 can also be reasonably designed. For example but not limited to: the cross section of the annular rib 691 may be configured in a square shape (as shown in FIG. 26). Alternatively, the cross section of the annular rib 691 may be configured in a semicircular shape (as shown in FIG. 27). Alternatively, the cross section of the annular rib 691 may be configured in a trapezoid shape (as shown in FIG. 28).

The above-mentioned design method of the cross-sectional shape of the annular rib 691 can make the abutting surface area of the annular rib 691 smaller, such that under the same pressing force, the pressure exerted by the annular rib 691 on the sealing sleeve 250 is greater, the sealing sleeve 250 is forced to undergo a large elastic deformation, so as to fit more closely with the annular rib 691, thereby effectively enhancing the sealing effect.

The annular rib 691 may have a regular or irregular annular design. For example, but not limited to, the annular rib 691 is designed in a polygonal shape (such as a square, a trapezoid, a pentagon, etc.), a circular design, or an oval design. In practical applications, the annular rib 691 should be consistent with the extension opening 510, and can be designed according to the specific shape and structure of the heat sink 240.

The number of annular ribs 691 is not limited here, and may specifically be two or more. A plurality of the annular ribs 691 are arranged in a zigzag shape along the periphery of the extension opening 510, the plurality of annular ribs 691 cooperate against the surface of the sealing sleeve 250 to form a multi-layered seal on the periphery of the heat sink 240, which greatly improves the sealing and waterproofing effect.

As shown in FIG. 11 and FIG. 12, the plurality of annular ribs 691 have annular ribs 631 located at the innermost ring and annular ribs 632 located at the outermost ring. It is considered here that the external water usually gradually penetrates from the outside to the inside from the gap between the extension opening 510 and the heat sink 240. In order to enhance the sealing effect of the electric control box 200, the annular rib 631 located at the innermost ring can be optionally extended along the periphery of the extension opening 510, the annular rib 631 located at the innermost ring abuts against the inner periphery of the sealing sleeve 250, and the annular rib 632 located at the outermost ring abuts against the outer periphery of the sealing sleeve 250.

The annular rib 631 located at the innermost ring extends along the periphery of the extension opening 510. The annular rib 631 located at the innermost ring and the inner periphery of the sealing sleeve 250 abut against the inlet position that can seal the gap, thereby directly blocking the infiltration path of external water, and the waterproof effect is good.

The annular rib 632 located at the outermost ring abuts against the outer peripheral edge of the sealing sleeve 250 to seal the outlet of the gap. Once the amount of water outside is large, it penetrates into the interior from the inlet position of the gap, and is blocked by the annular rib 632 at the outermost ring, making it difficult to pass through the outlet position of the gap.

As shown in FIG. 11 and FIG. 12, based on any one of the above embodiments, for the box body 210 of the electric control box 200, the bottom plate 211 of the box body 210 includes an outer metal bottom plate 300 and an inner plastic bottom plate 400, the outer metal base plate 300 and the inner plastic base plate 400 are fixed as a whole through a buckle 560 structure or a screw structure. The box cover 212 of the box body 210 includes an outer metal box cover 500 and an inner plastic box cover 600. The outer metal box cover 500 and the inner plastic box cover 600 may also be fixed as a whole through a snap structure or a screw structure.

It can be understood that the box body 210 of the electric control box 200 actually has an inner part and an outer part. The inner part is composed of the inner plastic bottom plate 400 and the inner plastic box cover 600; the outer part is composed of the outer metal bottom plate 300 and the outer metal box cover 500. Here, the annular rib 691 is provided at the inner plastic box cover 600, so that the annular rib 691 directly abuts against the sealing sleeve 250. The annular rib 691 and the inner plastic box cover 600 are integrally injection-molded, which is convenient.

Figure 13:
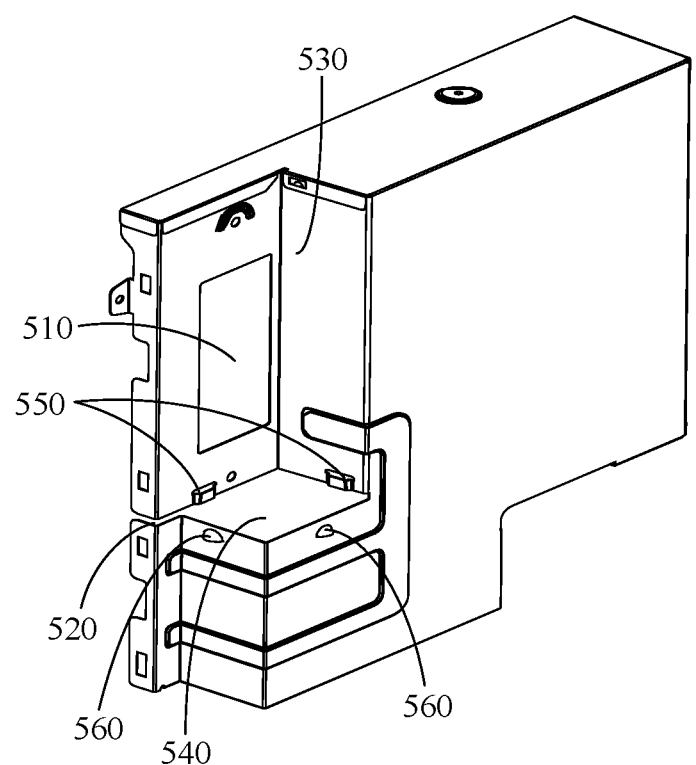
FIG. 13 is a schematic structural view of an outer metal box cover in FIG. 11.

As shown in FIG. 11 and FIG. 13, in an embodiment, considering that the outer metal box cover 500 of the box cover 212 is provided with the extension opening 510, the inner plastic box cover 600 is provided with an opening 603, and the extension opening 603 of the inner plastic box cover 600 should be correspondingly coincident with the extension opening 510 of the outer metal box cover 500. However, during the manufacturing and molding process, due to the possibility of manufacturing errors, the extension opening 510 of the outer metal box cover 500 may not correspond to the extension opening 603 of the inner plastic box cover 600, that is, the positions of the two are slightly deviated. As a result, it is difficult for the heat sink 240 to protrude through the extension opening 510 of the inner plastic box cover 600 and the extension opening 510 of the outer metal box cover 500 in sequence. Furthermore, the production mold of the box cover 212 needs to be readjusted, which will result in low production efficiency.

In view of this, in order to solve the above technical problem, a slit 520 extending from one side of the outer metal box cover 500 to the lower side of the extension opening 510 is formed. The slit 520 is suitable for adjusting the position of the extension opening 510 on the outer metal box cover 500 to correspond to the extension opening 510 on the inner plastic box cover 600.

By adjusting the size of the slit 520, the position of the extension opening 510 of the outer metal box cover 500 can be finely adjusted up and down. Therefore, the extension opening 510 of the outer metal box cover 500 can be aligned with the extension opening 603 on the inner plastic box cover 600 (equivalent to coincidence). Then, the heat sink 240 can be extended through the extension opening 603 of the inner plastic box cover 600 and the extension opening 510 of the outer metal box cover 500 in sequence. In this way, there is no need to readjust the production mold of the box cover 212, which reduces the rework process and helps to improve the production efficiency.

As shown in FIG. 11 to FIG. 14, it is also considered here that due to the existence of the slit 520 on the outer metal box body 210, the slit 520 reduces the strength of the outer metal box 210, so that the outer metal box 210 may be torn at the position of the slit 520. Therefore, considering that the outer metal box cover 500 is configured with an accommodation groove 530 for accommodating the heat sink 240 at a position corresponding to the extension opening 510, an opening 540 is formed at the bottom surface of the accommodation groove 530. The opening 540 is provided with a metal cover plate 260 covering the opening 540. Therefore, the metal cover plate 260 can be used to connect and fix the parts of the outer metal box cover 500 located at both sides of the slit 520.

Figure 14:
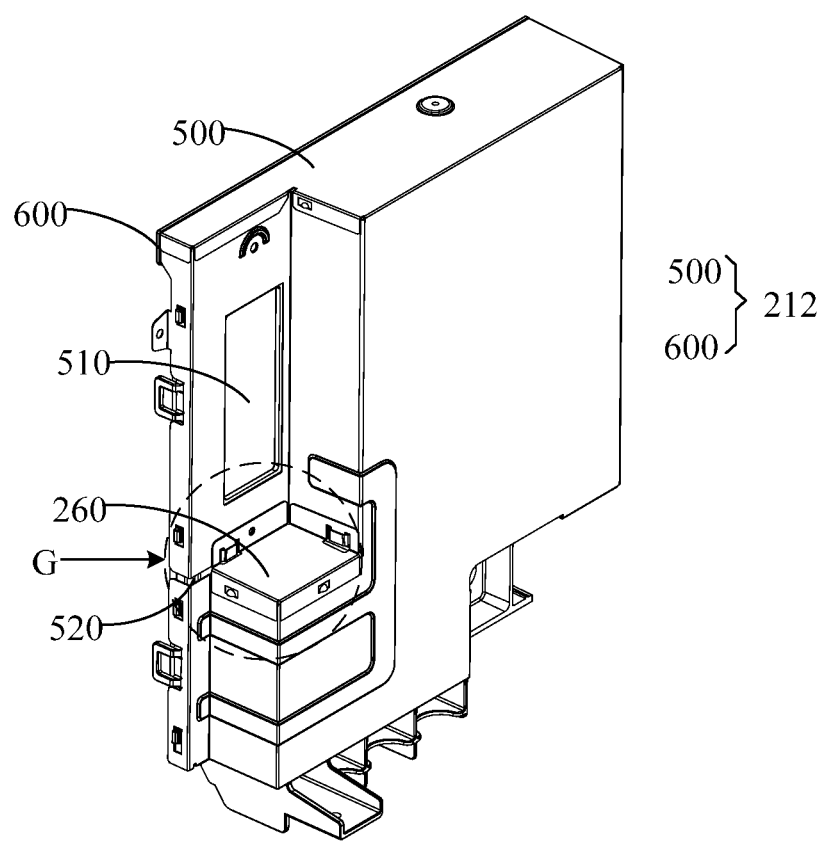
FIG. 14 is an assembly view of the outer metal box cover, the inner plastic box cover and the metal cover plate in FIG. 11.
Figure 15:
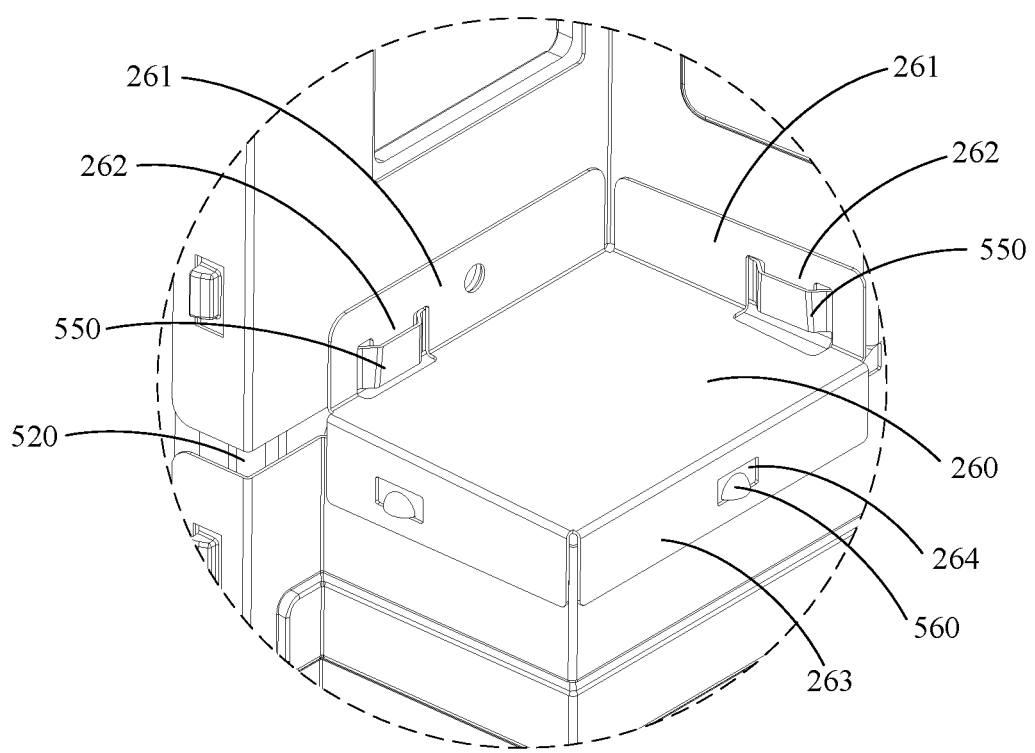
FIG. 15 is an enlarged view of portion Gin FIG. 14.
Figure 16:
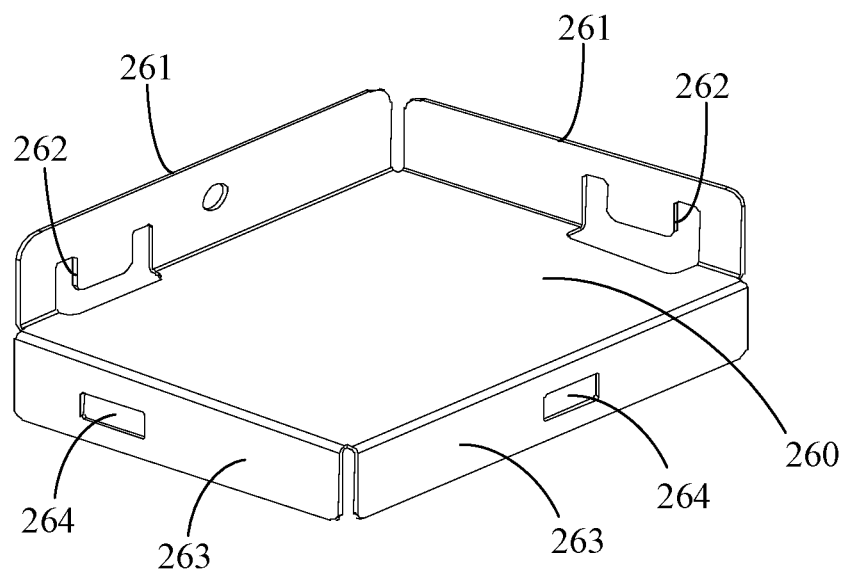
FIG. 16 is a schematic structural view of a metal cover plate in FIG. 14.

As shown in FIG. 14 to FIG. 16, the metal cover plate 260 is connected to the outer metal box cover 500. The metal cover plate 260 has two adjacent upper flanges 261 folded upwards. The upper flange 261 is provided with a through hole, and the upper edge of the through hole is extended with a plug-in piece 262 downward. The box body 210 is provided with a buckle 550 facing the upward opening 540 at a position on the upper side of the slit 520. The buckle 550 is suitable for inserting the plug-in piece 262 into it from top to bottom.

Further, the metal cover plate 260 also has two adjacent lower flanges 263 that are folded downwards. The lower flange 263 is buckled on the outer wall surface of the auxiliary cavity 602. One of the lower flange 263 and the outer wall surface of the auxiliary cavity 602 is provided with a clamping buckle 560. The other one is provided with a buckle hole 264 corresponding to the clamping buckle 560.

When installing the metal cover plate 260, it is possible to first cover the metal cover plate 260 to the opening 540 of the auxiliary cavity 602 of the box body 210 from top to bottom. During this process, the plug-in piece 262 on the upper fold of the metal cover plate 260 is aligned and inserted into the buckle 550 of the box body 210 to realize the insertion and positioning of the metal cover plate 260. Until the lower flange 263 of the metal cover 260 is buckled on the outer wall of the auxiliary cavity 602, then, the lower flange 263 and the outer wall surface of the auxiliary cavity 602 are correspondingly buckled through the clamping buckle 560 and the buckle hole 264, so as to connect and fix the two.

As shown in FIG. 1, the present disclosure further provides a window air conditioner 100. The window air conditioner 100 includes a chassis 110, a housing 120, an outdoor fan 160 and an electric control box 200. The specific structure of the electric control box 200 refers to the above-mentioned embodiment. Since the window air conditioner 100 adopts all the technical solutions of all the above-mentioned embodiments, it also has all the beneficial effects brought by the technical solutions of the above-mentioned embodiments, which will not be repeated here.

In an embodiment, the housing 120 is installed at the chassis 110, and the housing 120 is provided with a partition groove 123 for the shielding member at the window to extend into. The housing 120 is divided into an indoor housing 121 and an outdoor housing 122 by the partition groove 123, the outdoor fan 160 is installed at the outdoor housing 122. The electric control box 200 is installed in the outdoor housing 122, the electric control box 200 is arranged vertically, and the heat sink 240 of the electric control box 200 faces the outdoor fan 160.

The partition groove 123 is used for the shielding member located at the window of the wall to extend into. After the window air conditioner 100 is installed at the window of the wall, the outdoor box cover 212 is located outdoors, and the indoor box cover 212 is located indoors, which can block the noise generated by the outdoor components from propagating to the indoor side and achieve the noise reduction effect. Then, the shielding member is pulled down to extend into the partition groove 123 of the window air conditioner 100, the shielding member shields the gap between the two sides of the window air conditioner 100 and the side wall of the window, thereby reducing the leakage of indoor cooling or heat from the space to the outdoors. It should be noted that the shielding member can be a window sash, or a window blind, or a curtain, etc. that shields light, or other protective window panels that can shield external objects from entering the room.

As shown in FIG. 1, the window air conditioner 100 further includes an indoor heat exchanger 130, an outdoor heat exchanger 140, an indoor fan 150 and an outdoor fan 160. The indoor heat exchanger 130 and the indoor fan 150 are installed in the indoor housing 121; the outdoor heat exchanger 140 and the outdoor fan 160 are installed in the outdoor housing 122. When the window air conditioner 100 works, the indoor fan 150 drives the indoor air into the indoor housing 121 to exchange heat with the indoor heat exchanger 130, and blows the heat-exchanged air from the indoor housing 121 to the indoor environment, so as to achieve cooling and heating of the indoor environment. Meanwhile, the outdoor fan 160 drives the outdoor air into the outdoor housing 122 to exchange heat with the outdoor heat exchanger 140, and blows the heat-exchanged air from the outdoor housing 122 to the outdoor environment. The electric control box 200 is vertically installed in the outdoor housing 122, and the electric control box 200 is located at the air intake side of the outdoor fan 160, such that when the window air conditioner 100 works, the airflow driven by the outdoor fan 160 will pass around the electric control box 200, thereby taking away part of the heat generated by the electric control box 200.

As shown in FIG. 29 and FIG. 30, in an embodiment, the window air conditioner 100 further includes a sealing member 700 movably mounted in the partition groove 123, the sealing member 700 is movable to switch between a storage state and a working state. The sealing member 700 is stored in the partition groove 123 in the storage state; and the sealing member 700 protrudes laterally from the partition groove 123, and is configured for the shielding member and/or an inner wall of the window to abut against in the working state.

After the window air conditioner 100 is installed at the window, the sealing member 700 is moved to the working state, such that the sealing member 700 protrudes laterally from the partition groove 123 of the window air conditioner 100, and the bottom surface of the sealing member 700 abuts against the bottom wall of the window. Then, the shielding member is pulled down to extend into the partition groove 123 of the window air conditioner 100 until the lower edge of the shielding member comes into contact with the separation member and the sealing member 700. The sealing member 700 shields and seals the gap between the shielding member and the bottom wall of the window, so as to reduce the leakage of indoor cooling or heat from the gap to the outdoor. When the window air conditioner 100 is not needed or transported, the sealing member 700 is moved to the storage state, which reduces the space occupied by the sealing member 700 and facilitates the storage or packaging of the window air conditioner 100.

The sealing member 700 can be installed in a variety of ways. For example, the sealing member 700 is slidably installed at the partition groove 123; or, the sealing member 700 is rotatably installed at the partition groove 123; or, the sealing member 700 can be elastically and retractably installed at the partition groove 123. The sealing member 700 is rotatably installed at the partition groove 123 to switch between the working state and the storage state.

As shown in FIG. 4, FIG. 7 and FIG. 11, in an embodiment of the present disclosure, the electric control box 200 includes a box body 210 and an electric control board 220. The box body 210 includes a bottom plate 211 and a box cover 220 adapted to cover the bottom plate 211. The box cover 220 includes an outer metal box cover 500 and an inner plastic box cover 600, and the electric control board 220 is mounted at the bottom plate 211. The inner plastic box cover 600 is provided with a main cavity 601, and the main cavity 601 is suitable for accommodating the components on the electric control board 220. A heat dissipation gap is formed between the side wall of the main cavity 601 and the outer metal box cover 500, and a heat dissipation hole 680 corresponding to the heat dissipation gap is also formed through the side wall of the main cavity 601.

As shown in FIG. 11 to FIG. 17, the electric control assemblies of the electric control box 200 include an electric control board 220 installed in the box body 210, an inductor 230, a heat sink 240 and the like. The electric control board 220 and the inductor 230 are installed at the bottom plate 211 in the up-down direction, and the heat sink 240 is installed at the electric control board 220. The bottom plate 211 of the box body 210 includes an outer metal bottom plate 300 and an inner plastic bottom plate 400.

That is to say, the box body 210 of the electric control box 200 actually has an inner part and an outer part. The inner part is composed of an inner plastic bottom plate 400 and an inner plastic box cover 600. The inner part is made of plastic material, which is easy to manufacture and has low manufacturing cost. The outer part is composed of the outer metal bottom plate 300 and the outer metal box cover 500. The outer part is made of sheet metal parts, which can play the role of fire prevention and rust prevention, so that the electric control box 200 has high safety performance. When assembling the electric control box 200, the electric control board 220 is first installed at the bottom plate 211; then, the box cover 220 is covered on the bottom plate 211.

Due to the performance difference of materials, the heat transfer efficiency of the inner plastic box cover 600 is lower than the heat transfer efficiency of the outer metal box cover 500. In the related art, if the side wall of the main cavity 601 is not provided with the heat dissipation hole 680, then, the heat generated by the electric control box 200 needs to be transferred to the inner plastic box cover 600 first, and then transferred to the outer metal box cover 500 through the inner plastic box cover 600, resulting in poor heat dissipation efficiency.

In technical solutions of the present disclosure, a heat dissipation gap is formed between the side wall of the main cavity 601 and the outer metal box cover 500. A heat dissipation hole 680 corresponding to the heat dissipation gap is also formed through the side wall of the main cavity 601, such that the electric control board 220 can directly radiate heat to the outer metal box cover 500 through the heat dissipation holes 680 and the heat dissipation gap, and finally radiate the heat outward through the outer metal box cover 500. The existence of the heat dissipation gap enables air to flow in the heat dissipation gap, thereby accelerating the heat transfer in the main cavity 601 to the outer metal box cover 500, and effectively improving the heat dissipation efficiency.

Figure 8:
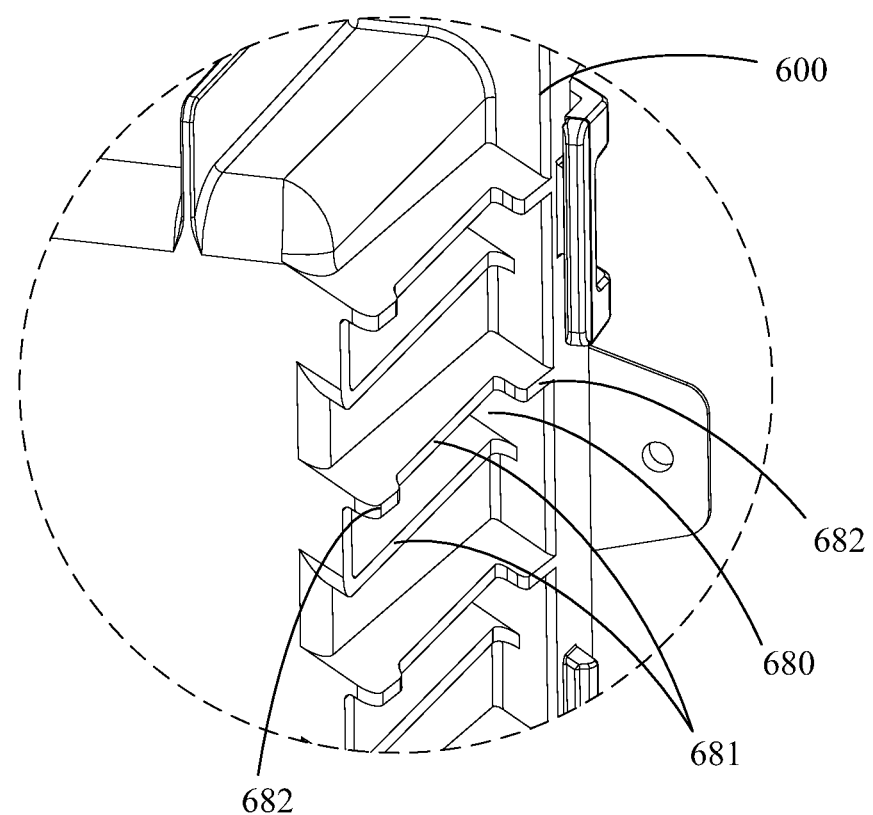
FIG. 8 is an enlarged view of portion E in FIG. 7.

As shown FIG. 7 and FIG. 8, in an embodiment, the number of the heat dissipation holes 680 is multiple. There may be various forms for the arrangement of the plurality of heat dissipation holes 680. For example, a plurality of heat dissipation holes 680 are spaced apart along the front-rear direction; or, a plurality of the heat dissipation holes 680 are spaced apart along the up-down direction. A plurality of the heat dissipation holes 680 are spaced apart in the up-down direction. The shape of the heat dissipation hole 680 is not limited herein. For example, but not limited to, the heat dissipation holes 680 may be circular holes, square holes, or elongated holes. The heat dissipation holes 680 are elongated holes.

In order to prevent water from the external environment from entering the main cavity 601 of the inner plastic box cover 220 from the heat dissipation holes 680, the outer metal box cover 500 covers the plurality of heat dissipation holes 680 on the inner plastic box cover 600. This not only prevents water from the external environment from entering the inner plastic box cover 220 from the heat dissipation holes 680, but also prevents the electric control assemblies inside the electric control box 200 from being exposed outside the box body 210, thereby improving the safety performance of the electric control box 200.

As shown in FIG. 7 and FIG. 8, however, considering that the moisture in the external environment may penetrate into the interior through the gap at the top of the outer metal bottom plate 300 and the outer metal box cover 500, and then enter the main cavity 601 from the heat dissipation hole 680, causing the electric control board 220 to be damaged due to moisture. In order to avoid the above-mentioned situation, a water baffle 681 protrudes laterally on the periphery of the heat dissipation hole 680. The water baffle 681 surrounds the heat dissipation holes 680 to block the heat dissipation holes 680, so as to prevent the water dripping from the top of the inner plastic box cover 600 from entering the heat dissipation holes 680.

Further, the plate surface of the water baffle 681 is inclined downward from the inner side of the heat dissipation hole 680 to the outer side thereof. When the water in the external environment is on the side wall of the main water cavity 601, it is shielded and guided by the water baffle 681 and drips downward in sequence, then flows to the bottom of the box body 210, and finally is discharged from the gap at the bottom of the box body 210 to the chassis 110. Therefore, water droplets can be prevented from entering the main cavity 601 from the heat dissipation holes 680, and the occurrence of failure of the electric control board 220 due to moisture is reduced.

Figure 9:
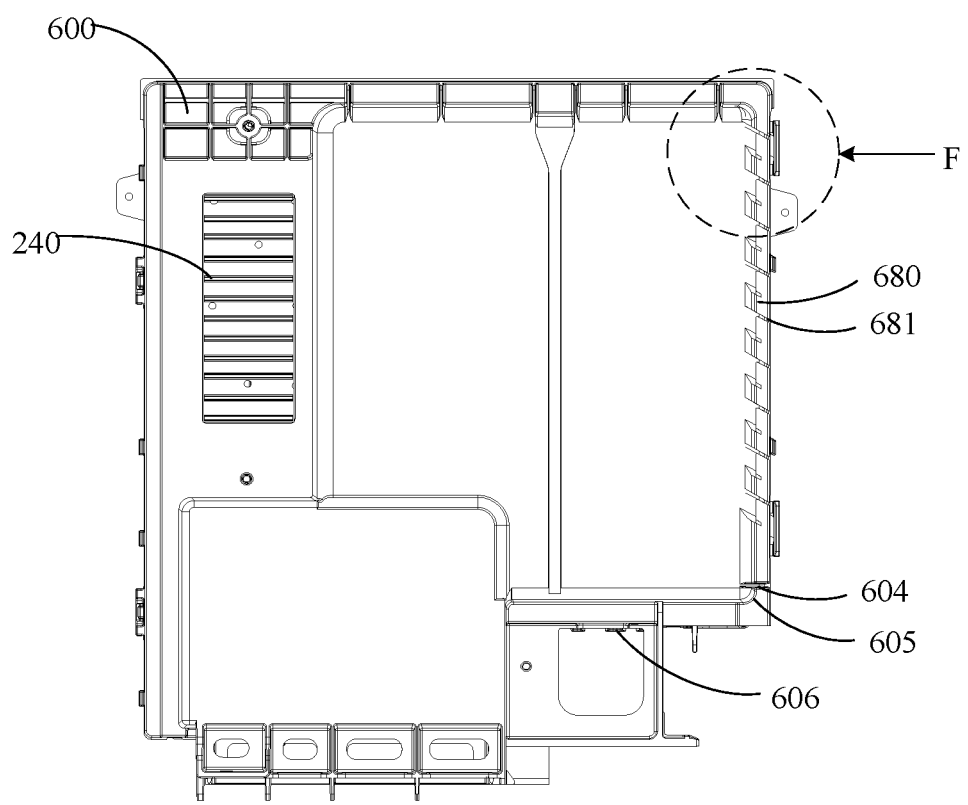
FIG. 9 is a rear view of an inner plastic box cover in FIG. 7.
Figure 10:
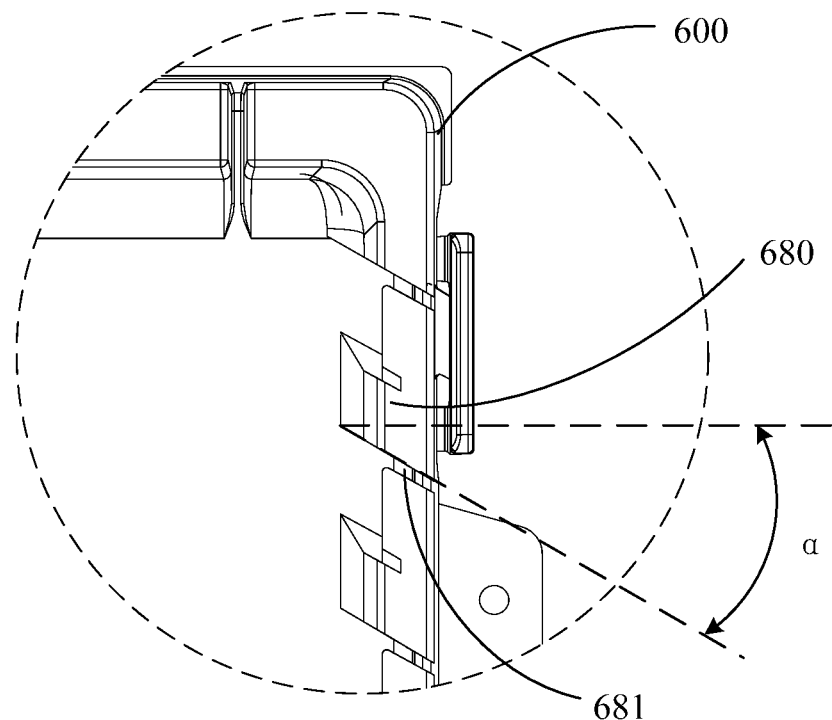
FIG. 10 is an enlarged view of portion F in FIG. 9.

As shown in FIG. 9 and FIG. 10, the surface of the water baffle 681 slopes downward from the inner side of the heat dissipation hole 680 to the outer side thereof, so an angle is formed between the surface of the water baffle 681 and the horizontal plane. Considering that if the angle is large, the water baffle will block the heat dissipation holes, which is not conducive to the heat dissipation of the air dissipation holes. However, if the angle is too small, the effect of the water baffle to guide water downward is not obvious.

In view of this, the angle formed by the plate surface of the water baffle 681 and the horizontal plane is not less than 15° and not more than 50°. Specifically, the angle may be, but not limited to, 15°, 20°, 25°, 30°, 35°, 40°, 45°, and the like. By limiting the angle within this range, the water baffle 681 cannot overly block the heat dissipation holes 680, so as to ensure the heat dissipation holes 620 to quickly dissipate heat. In addition, the water baffle 681 obtains a better slope, which can well guide water downward and prevent water flow from entering the heat dissipation holes 680.

As shown in FIG. 8 to FIG. 10, since a heat dissipation gap is formed between the side wall of the main cavity 601 and the outer metal box cover 500, when the electric control box 200 is used for a period of time or when external components are pressed against the outer metal box cover 500, the outer metal box cover 500 may be dented and deformed toward the heat dissipation gap. In view of this, the two ends of the water baffle 681 are provided with support protrusions 682 protruding therefrom. The support protrusion 682 is suitable for abutting against the side wall of the outer metal box cover 500 to support the side wall of the outer metal box cover 500. The side wall of the outer metal box cover 500 is not easily deformed into the heat dissipation gap, so as to ensure the integrity of the box body 210 of the electric control box 200.

Based on any of the above embodiments, the bottom of the inner plastic box cover 600 is provided with a corner at one end corresponding to the main cavity 601, so that a notch for the wire supply to pass through the electric control box 200 is formed at the corner position. The corner position 605 between the notch and the side wall of the main cavity 601 is configured with a water blocking plate 604. The water blocking plate 604 is suitable for blocking the flow of water from the side wall of the main cavity 601 to the notch.

The top wall or side wall of the notch is provided with a wire outlet hole 606. The wires inside the electric control box 200 pass through the wire outlet hole 606 to the position of the notch, and then are pulled from the notch to the electric control assemblies of the window air conditioner 100 (e.g. a display panel, or an outdoor temperature sensor, or an indoor temperature sensor, or a discharge or return air temperature sensor of a compressor, etc.).

Since a corner is formed between the notch and the side wall of the main cavity 601, by constructing the water blocking plate 604 at the corner position 605, the water blocking plate 604 shields the water flowing down from the water baffle 681, and then discharges downward from the side of the water blocking plate 604 away from the corner position 605. In this way, the water can be prevented from flowing along the corner position 605 to the wire outlet hole 606 on the top wall of the notch, and thus the wire body is damped.

In an embodiment, the outer metal box cover 500 is configured with a corner cover plate 590 corresponding to the corner position 605. A drainage gap 593 is formed at the corner cover plate 590, and the drainage gap 593 is suitable for draining the water flowing down from the water blocking plate 604. The drainage gap 593 may be a drainage through hole or a slit.

The corner cover plate 590 includes a bottom plate 591 and a side plate 592 connected to one end of the bottom plate 591. The side plate 592 is folded upward to connect with the side plate of the outer metal box cover 500. The drainage gap 593 is formed at the folded position between the bottom plate 591 and the side plate 592.

The corner cover plate 590 is provided with a slit at the position where the bottom plate 591 and the side plate 592 are connected, and the slit is for the convenience of folding the side plate 592. Therefore, the slit is just used as the drainage gap 593, so that there is no need to open additional drainage holes, the manufacturing process is reduced, and the production efficiency is improved.

As shown in FIG. 1, the present disclosure further provides a window air conditioner 100. The window air conditioner 100 includes a chassis 110, a housing 120, an outdoor fan 160 and an electric control box 200. The specific structure of the electric control box 200 refers to the above-mentioned embodiment. Since the window air conditioner 100 adopts all the technical solutions of all the above-mentioned embodiments, it also has all the beneficial effects brought by the technical solutions of the above-mentioned embodiments, which will not be repeated here.

In an embodiment, the housing 120 is installed at the chassis 110, and the housing 120 is provided with a partition groove 123 for the shielding member at the window to extend into. The housing 120 is divided into an indoor housing 121 and an outdoor housing 122 by the partition groove 123, the outdoor fan 160 is installed at the outdoor housing 122. The electric control box 200 is installed in the outdoor housing 122, the electric control box 200 is arranged vertically, and the heat sink 240 of the electric control box 200 faces the outdoor fan 160.

The partition groove 123 is used for the shielding member located at the window of the wall to extend into. After the window air conditioner 100 is installed at the window of the wall, the outdoor box cover 212 is located outdoors, and the indoor box cover 212 is located indoors, which can block the noise generated by the outdoor components from propagating to the indoor side and achieve the noise reduction effect. Then, the shielding member is pulled down to extend into the partition groove 123 of the window air conditioner 100, the shielding member shields the gap between the two sides of the window air conditioner 100 and the side wall of the window, thereby reducing the leakage of indoor cooling or heat from the space to the outdoors. It should be noted that the shielding member can be a window sash, or a window blind, or a curtain, etc. that shields light, or other protective window panels that can shield external objects from entering the room.

The window air conditioner 100 further includes an indoor heat exchanger 130, an outdoor heat exchanger 140, an indoor fan 150 and an outdoor fan 160. The indoor heat exchanger 130 and the indoor fan 150 are installed in the indoor housing 121; the outdoor heat exchanger 140 and the outdoor fan 160 are installed in the outdoor housing 122. When the window air conditioner 100 works, the indoor fan 150 drives the indoor air into the indoor housing 121 to exchange heat with the indoor heat exchanger 130, and blows the heat-exchanged air from the indoor housing 121 to the indoor environment, so as to achieve cooling and heating of the indoor environment. Meanwhile, the outdoor fan 160 drives the outdoor air into the outdoor housing 122 to exchange heat with the outdoor heat exchanger 140, and blows the heat-exchanged air from the outdoor housing 122 to the outdoor environment. The electric control box 200 is vertically installed in the outdoor housing 122, and the electric control box 200 is located at the air intake side of the outdoor fan 160, such that when the window air conditioner 100 works, the airflow driven by the outdoor fan 160 will pass around the electric control box 200, thereby taking away part of the heat generated by the electric control box 200.

As shown in FIG. 28 and FIG. 29, in an embodiment, the window air conditioner 100 further includes a sealing member 700 movably mounted in the partition groove 123, the sealing member 700 is movable to switch between a storage state and a working state. The sealing member 700 is stored in the partition groove 123 in the storage state; and the sealing member 700 protrudes laterally from the partition groove 123, and is configured for the shielding member and/or an inner wall of the window to abut against in the working state.

After the window air conditioner 100 is installed at the window, the sealing member 700 is moved to the working state, such that the sealing member 700 protrudes laterally from the partition groove 123 of the window air conditioner 100, and the bottom surface of the sealing member 700 abuts against the bottom wall of the window. Then, the shielding member is pulled down to extend into the partition groove 123 of the window air conditioner 100 until the lower edge of the shielding member comes into contact with the separation member and the sealing member 700. The sealing member 700 shields and seals the gap between the shielding member and the bottom wall of the window, so as to reduce the leakage of indoor cooling or heat from the gap to the outdoor. When the window air conditioner 100 is not needed or transported, the sealing member 700 is moved to the storage state, which reduces the space occupied by the sealing member 700 and facilitates the storage or packaging of the window air conditioner 100.

The sealing member 700 can be installed in a variety of ways. For example, the sealing member 700 is slidably installed at the partition groove 123; or, the sealing member 700 is rotatably installed at the partition groove 123; or, the sealing member 700 can be elastically and retractably installed at the partition groove 123. The sealing member 700 is rotatably installed at the partition groove 123 to switch between the working state and the storage state.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. An electric control box comprising:
   a box body including:
   a bottom plate; and
   a box cover covering the bottom plate and including:
   an outer box cover; and
   an inner box cover including a water blocking member at an edge of the inner box cover, the water blocking member protruding outward from the edge of the inner box cover toward an edge of the outer box cover, and the water blocking member being configured to block water on the outer box cover from flowing into the inner box cover.

2. The electric control box of claim 1, wherein the inner box cover includes an upper cover plate corresponding to a top wall of the outer box cover, a flange extends from an outer side of the upper cover plate toward an outer side of the outer box cover, and the flange forms the water blocking member.

3. The electric control box of claim 2, wherein:
   the top wall of the outer box cover is provided with an installation member, and the installation member is provided with an installation hole configured for a connection member to pass through to connect and fix the box body to an external structure; and
   a top of the inner box cover is configured with a drainage groove corresponding to the installation hole.

4. The electric control box of claim 3, wherein a back of the inner box cover is configured with a guiding groove extending in an up-down direction, an upper end of the guiding groove is connected with the drainage groove, and a lower end of the guiding groove extends to a bottom of the inner box cover.

5. The electric control box of claim 2, wherein:
   the inner box cover includes a first side plate and a second side plate opposite to the first side plate;
   a slot is configured on the inner box cover, the slot extends from the first side plate, via the upper cover plate, and to the second side plate, and both ends of the slot open downward; and
   the bottom plate includes an outer bottom plate and an inner bottom plate, and a peripheral edge of the inner bottom plate is configured with an insertion member corresponding to the slot.

6. The electric control box of claim 5, wherein:
the insertion member of the inner bottom plate is further configured with a sealing groove, an extension direction of the sealing groove is consistent with an extension direction of the insertion member, and a sealing strip is provided in the sealing groove; and
a positioning protrusion protrudes from an inner surface of the slot toward the sealing groove, and the positioning protrusion protrudes into the sealing groove and abuts against the sealing strip.

7. The electric control box of claim 1, wherein:
the outer box cover includes an outer metal box cover made of metal, and the inner box cover includes an inner plastic box cover made of plastic; and/or
the bottom plate includes:
an outer metal bottom plate made of metal; and
an inner plastic bottom plate made of plastic.

8. The electric control box of claim 7, further comprising:
an electric control board and an inductor mounted at the bottom plate;
wherein the inner box cover includes:
a main cavity accommodating components of the electric control board; and
an auxiliary cavity accommodating the inductor.

9. The electric control box of claim 8, wherein the electric control board is installed at the inner plastic bottom plate, and the inner plastic bottom plate has a hollowed-out position corresponding to the electric control board to form a heat dissipation area between the electric control board and the outer metal bottom plate.

10. The electric control box of claim 9, wherein:
the inner plastic bottom plate is provided with a grid bracket at the hollowed-out position of the inner plastic bottom plate;
the grid bracket is spaced apart from the electric control board and the outer metal bottom plate; and
the heat dissipation area includes:
an inner heat dissipation area between the grid bracket and the electric control board; and
an outer heat dissipation area between the grid bracket and the outer metal bottom plate.

11. The electric control box of claim 10, wherein a distance between the electric control board and the outer metal bottom plate is not less than 8 mm and not more than 18 mm.

12. The electric control box of claim 8, wherein:
a heat dissipation gap is formed between a side wall of the main cavity and the outer box cover;
the side wall of the main cavity is provided with a plurality of heat dissipation holes corresponding to the heat dissipation gap and arranged in an up-down direction at intervals.

13. The electric control box of claim 12, wherein:
a periphery of one heat dissipation hole of the heat dissipation holes is provided with a water baffle protruding from the periphery, and a surface of the water baffle is inclined downward from an inner side of the one heat dissipation hole to an outer side of the one heat dissipation hole; and
two ends of the water baffle are provided with support protrusions protruding from the two ends, and the support protrusions are configured to abut against a side wall of the outer metal box cover.

14. The electric control box of claim 1, further comprising:
an electric control assembly mounted at the bottom plate and including an electric control board and a heat sink mounted at the electric control board; and
a sealing sleeve sleeved on a circumference of the heat sink;
wherein:
the box cover is provided with an extension opening for the heat sink to protrude outward; and
an inner surface of the box cover is formed with a sink groove on a circumference of the extension opening, and the sink groove is fitted and engaged with the sealing sleeve.

15. The electric control box of claim 14, wherein a surface of the sink groove is provided with a plurality of annular ribs protruding from the surface of the sink groove, the plurality of annular ribs surround the circumference of the extension opening successively, and the annular ribs abut against a surface of the sealing sleeve.

16. The electric control box of claim 14, wherein the outer box cover is provided with a slit extending from one side of the outer box cover to a lower side of the extension opening, and the slit is configured to adjust a position of the extension opening on the outer box cover to correspond to the extension opening on the inner box cover.

17. The electric control box of claim 16, wherein the outer box cover is provided with an accommodation groove accommodating the heat sink at a position corresponding to the extension opening, an opening is formed at a bottom surface of the accommodation groove, the opening is provided with a metal cover plate covering the opening, and the metal cover plate connects and fixes parts of the outer box cover located at two sides of the slit.

18. A window air conditioner comprising:
a chassis;
a housing mounted at the chassis and including an outdoor housing and an indoor housing, a top plate of the outdoor housing being provided with an outdoor air inlet;
an outdoor fan mounted inside the outdoor housing; and
an electric control box installed at the outdoor housing, the electric control box being vertical and corresponding to an air inlet side of the outdoor fan, the electric control box including:
a bottom plate; and
a box cover covering the bottom plate and including:
an outer box cover; and
an inner box cover including a water blocking member at an edge of the inner box cover, the water blocking member protruding outward from the edge of the inner box cover toward an edge of the outer box cover, and the water blocking member being configured to block water on the outer box cover from flowing into the inner box cover.

19. The window air conditioner of claim 18, wherein:
the outdoor air inlet has an inlet edge away from the outdoor fan;
a box cover of the electric control box corresponds to the inlet edge;
a water blocking member of the box cover is located at a side of the inlet edge that faces away from the outdoor air inlet; and
a distance between the water blocking member and the inlet edge is not less than 6 mm and not more than 50 mm.

20. The window air conditioner of claim 18,
wherein the housing is provided with a partition groove dividing the housing into the indoor housing and the outdoor housing;
the window air conditioner further comprising:
 a sealing member movably mounted in the partition groove, the sealing member being movable to switch between:
  a storage state in which the sealing member is stored in the partition groove; and
  a working state in which the sealing member protrudes laterally from the partition groove.

\* \* \* \* \*